United States Patent
Komi et al.

(10) Patent No.: US 9,794,018 B2
(45) Date of Patent: Oct. 17, 2017

(54) OPTICAL NETWORK SYSTEM AND OPTICAL COMMUNICATION METHOD

(71) Applicant: FUJITSU LIMITED, Kawasaki-shi, Kanagawa (JP)

(72) Inventors: Masamitsu Komi, Yokohama (JP); Tadanori Yokosawa, Yokosuka (JP); Hirokazu Shimada, Kanagawa (JP); Tamotsu Inoue, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/822,110

(22) Filed: Aug. 10, 2015

(65) Prior Publication Data

US 2015/0349912 A1 Dec. 3, 2015

Related U.S. Application Data

(63) Continuation of application No. PCT/JP2013/056501, filed on Mar. 8, 2013.

(51) Int. Cl.
*H04B 10/079* (2013.01)
*H04B 10/2525* (2013.01)
(Continued)

(52) U.S. Cl.
CPC .... *H04J 14/0246* (2013.01); *H04B 10/07957* (2013.01); *H04B 10/25754* (2013.01);
(Continued)

(58) Field of Classification Search
CPC ............... H04J 14/0246; H04J 14/0245; H04J 14/0247; H04J 14/025; H04B 10/07957;
(Continued)

(56) References Cited

U.S. PATENT DOCUMENTS 6,172,782 B1 * 1/2001 Kobayashi .............. H04J 14/02
370/219
6,288,809 B1 * 9/2001 Touma .................. H04J 3/1694
398/9
(Continued)

FOREIGN PATENT DOCUMENTS

JP 2001-217783 A 8/2001
JP 2006-197489 A 7/2006
(Continued)

OTHER PUBLICATIONS

International Search Report issued for corresponding International Patent Application No. PCT/JP2013/056501, mailed May 7, 2013.

*Primary Examiner* — Dalzid Singh
(74) *Attorney, Agent, or Firm* — Myers Wolin, LLC

(57) ABSTRACT

An optical network system includes an optical line terminal, an optical splitter that is connected to the optical line terminal via one first optical fiber, and a plurality of optical network units that are connected to the optical splitter via respective second optical fibers. The plurality of optical network units communicate with the optical line terminal using an optical signal of a working wavelength uniquely assigned to each of them. The optical line terminal communicates with an optical network unit that is connected to the optical splitter using an optical signal of a working wavelength and an optical signal of a spare wavelength that is common to a plurality of optical networks.

12 Claims, 9 Drawing Sheets

(51) Int. Cl.
*H04J 14/02* (2006.01)
*H04Q 11/00* (2006.01)
*H04B 10/2575* (2013.01)

(52) U.S. Cl.
CPC ........ *H04J 14/025* (2013.01); *H04J 14/0245* (2013.01); *H04J 14/0247* (2013.01); *H04Q 11/0005* (2013.01); *H04Q 11/0067* (2013.01); *H04Q 2011/0016* (2013.01); *H04Q 2011/0081* (2013.01); *H04Q 2011/0086* (2013.01)

(58) Field of Classification Search
CPC ......... H04B 10/25754; H04Q 11/0005; H04Q 11/0067; H04Q 2011/0016; H04Q 2011/0081; H04Q 2011/0086
USPC .......................................................... 398/34
See application file for complete search history.

(56) References Cited

U.S. PATENT DOCUMENTS

| | | | |
|---|---|---|---|
| 8,467,676 B2* | 6/2013 | Villarruel | H04B 10/032 398/10 |
| 2006/0153565 A1* | 7/2006 | Park | H04J 14/0226 398/71 |
| 2008/0131129 A1* | 6/2008 | Bouda | G02B 6/12007 398/82 |
| 2009/0220230 A1* | 9/2009 | Kim | H04B 10/2587 398/72 |
| 2011/0158638 A1* | 6/2011 | Mie | H04L 12/413 398/16 |

FOREIGN PATENT DOCUMENTS

| | | |
|---|---|---|
| JP | 2007-43270 A | 2/2007 |
| JP | 2010-34877 A | 2/2010 |
| JP | 2010-245987 A | 10/2010 |

* cited by examiner

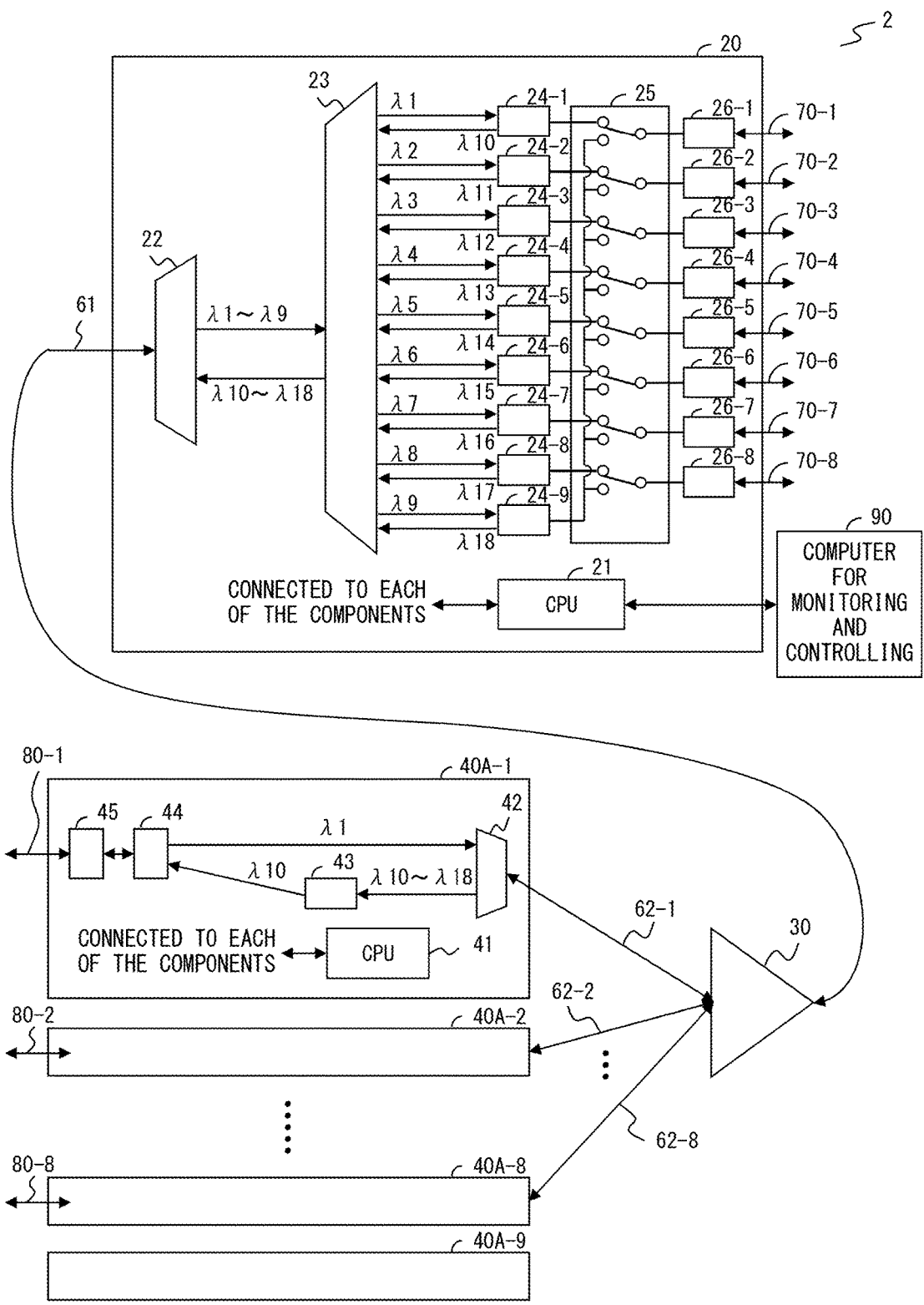
F I G. 2

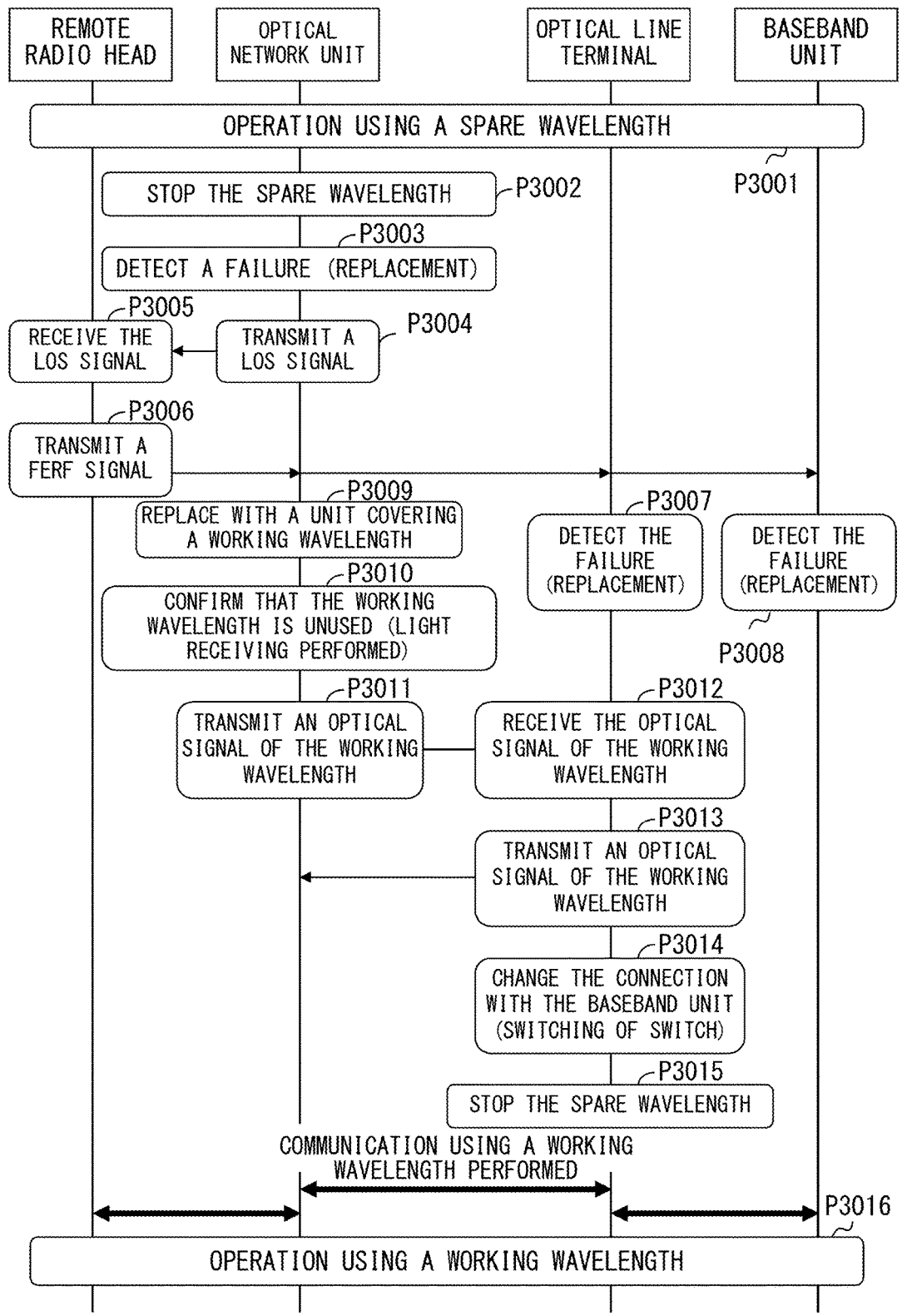
F I G. 5

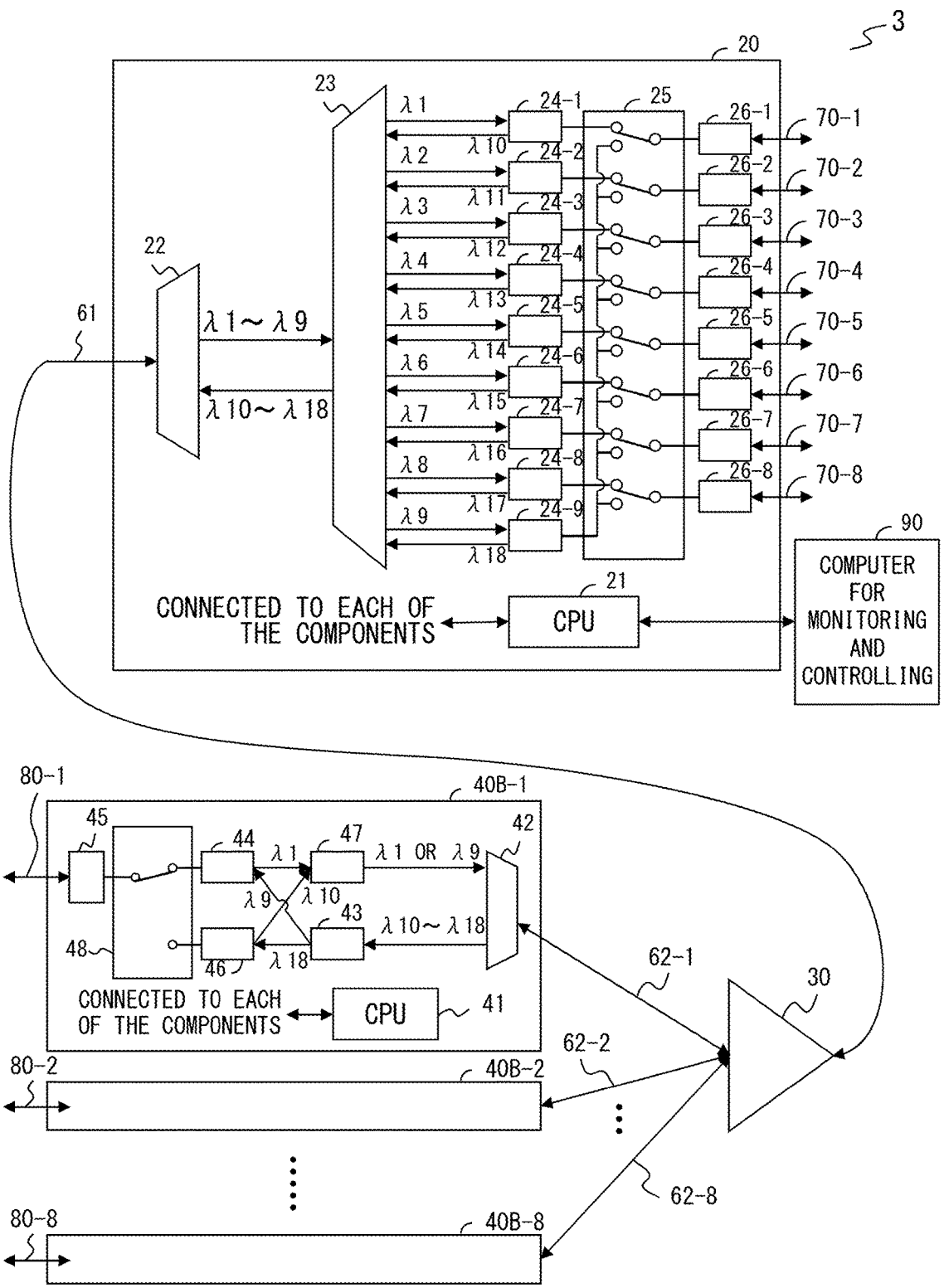
F I G. 6

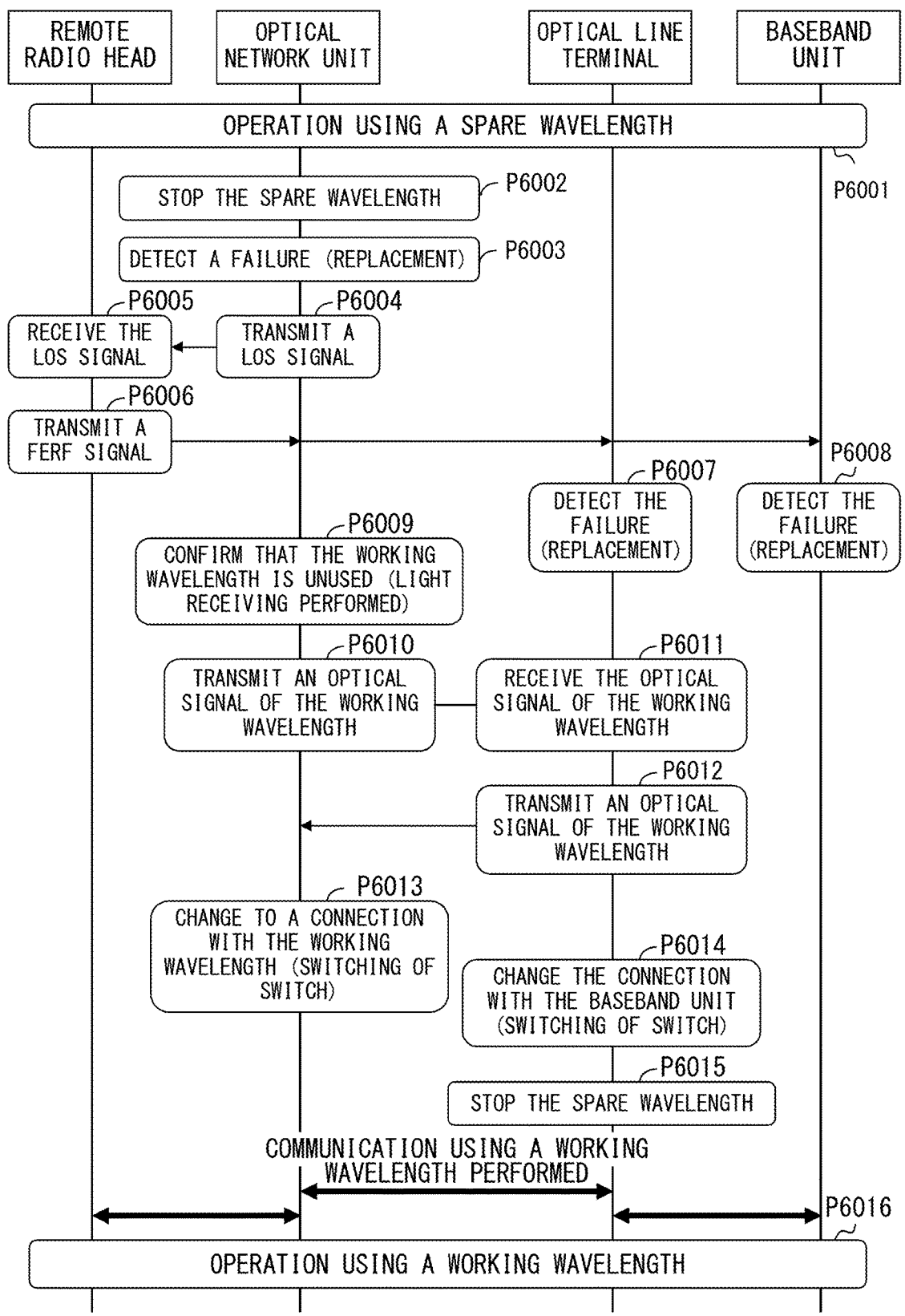
F I G. 9

OPTICAL NETWORK SYSTEM AND OPTICAL COMMUNICATION METHOD

CROSS-REFERENCE TO RELATED APPLICATION

This application is a continuation application of International Application PCT/JP2013/056501 filed on Mar. 8, 2013 and designated the U.S., the entire contents of which are incorporated herein by reference.

FIELD

The present invention relates to an optical network system and an optical communication method.

BACKGROUND

In recent years, research and development on optical communication technologies that permit a realization of a higher transmission speed and a higher transmission capacity has been being carried out. One of these technologies is a WDM-PON technology that is a combination of a wavelength-division multiplexing (WDM) technology and a passive optical network (PON).

The WDM technology is an optical communication technology that multiplex transmits a plurality of optical signals of different wavelengths simultaneously via one (single-core) optical fiber. Transmission efficiency can be improved by use of the WDM technology because the plurality of optical signals are multiplex transmitted simultaneously via one optical fiber. Further, using the WDM technology permits establishing of an optical network with a high speed and high capacity at a low cost without increasing the number of optical fibers.

The PON is a form of an optical network in which a passive optical splitter is placed between an optical line terminal placed on a carrier side and a plurality of optical line terminals placed on a subscriber side. In the PON, the optical line terminal placed on a carrier side is connected to the optical splitter via one (single-core) optical fiber, and a plurality of optical fibers obtained by diverging by the optical splitter are connected to the plurality of optical line terminals placed on a subscriber side, respectively. The PON permits establishing of an optical network at a low cost because one optical fiber that is placed between an optical subscriber-terminal on a carrier side and the optical splitter is shared for a communication between the optical subscriber-terminal on a carrier side and the plurality of optical line terminals on a subscriber side.

In the WDM-PON that is a combination of the two technologies described above, different wavelengths are assigned to an optical signal transmitted by the optical line terminal on a subscriber side to the optical line terminal on a carrier side and an optical signal received by the optical line terminal on a subscriber side from the optical line terminal on a carrier side. Further, different wavelengths are assigned to those transmitted and received optical signals for each of the optical line terminals on a subscriber side. Thus, using the WDM-PON permits transmitting of an optical signal without interfering with other optical signals when one optical fiber is shared for transmitting a plurality of optical signals between each of the optical line terminals on a subscriber side and an optical line terminal on a carrier side. Further, the shared one optical fiber permits realizing of an optical communication with high speed and high capacity.

However, in the WDM-PON, when a failure has occurred in a transmission of an optical signal between an optical line terminal on a subscriber side and an optical line terminal on a carrier side, a replacement with a spare unit that covers the same wavelength as the wavelength in which the failure occurred is needed so as to recover from the failure.

The number of combinations of wavelengths of optical signals transmitted and received between an optical line terminal on a subscriber side and an optical line terminal on a carrier side increases as the number of optical line terminals that are placed on a subscriber side increases. Thus, preparing in advance all spare units for all the optical line terminals on a subscriber side and on a carrier side leads to an increase in costs for maintenance and operation for an optical communication system.

Further, a mistaken replacement of an optical line terminal on a subscriber side or on a carrier side with a spare unit that covers a different wavelength will induce a failure in other optical lines that have no reason to fail.

The following is known as a technology relating to the WDM-PON technology. Namely, an optical transmission terminal modulates a signal in the upstream direction that deals with the information from the optical transmission terminal side, and converts the upstream signal obtained by the modulation into an upstream optical signal of a designated wavelength. The optical transmission terminal supplies the upstream optical signal obtained by the conversion to a first optical star coupler via a second optical star coupler. The first optical star coupler multiplexes the upstream optical signals supplied from a plurality of optical transmission terminals for wavelength multiplexing, and supplies the wavelength multiplexed upstream optical signal to an optical subscriber-line terminal. Further, the optical subscriber-line terminal modulates a downstream signal that deals with the information of the optical subscriber-line terminal side, and photoconverts the downstream optical signal obtained by the modulation with a wavelength different from those of the multiplexed upstream optical signal and the other downstream optical signals. The optical subscriber-line terminal supplies the photoconverted downstream signal to the first star coupler via a third optical star coupler. The first star coupler diverges the multiplexed downstream optical signal for each path and supplies the downstream signals obtained by the diverging to the respective optical transmission terminals.

The following technology is also known. Namely, sets of wavelengths ($\lambda u1$, $\lambda d1$) and ($\lambda u2$, $\lambda d2$) that are a pair of a wavelength of an upstream signal and a wavelength of a downstream signal are assigned to each PON system that transmits a signal between a center side unit (OLT) and a subscriber side unit (ONU) via a plurality of optical transmission paths. In a PON system, a working path and a spare path are set via two sets of wavelengths ($\lambda u1$, $\lambda d1$) and ($\lambda u2$, $\lambda d2$), and communications through a working path and a spare path are always established. Dynamic SWs placed opposite to the OLT and the ONU always confirm connectivity by a continuous check (CC) on working and spare connections. When a failure has occurred on the working connection, a switching from the working connection to the spare connection is performed by the opposite dynamic SW.

CITATION LIST

Patent Document

Patent Document 1: Japanese Laid-open Patent Publication No. 2001-217783
Patent Document 2: Japanese Laid-open Patent Publication No. 2010-34877

SUMMARY

An optical network system according to an aspect of the present invention includes an optical line terminal, an optical splitter that is connected to the optical line terminal via one first optical fiber, and a plurality of optical network units that are connected to the optical splitter via respective second optical fibers. The plurality of optical network units communicate with the optical line terminal using an optical signal of a working wavelength uniquely assigned to each of them. The optical line terminal communicates with an optical network unit that is connected to the optical splitter using an optical signal of a working wavelength and an optical signal of a spare wavelength that is common to a plurality of optical network units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a hardware block diagram which illustrates an exemplary optical network system according to the first embodiment.

FIG. 5 is a sequence diagram which illustrates exemplary processing of switching of operation from a spare wavelength to a working wavelength in the optical network system according to the first embodiment.

FIG. 6 is a hardware block diagram which illustrates an exemplary optical network system according to a second embodiment.

FIG. 9 is a sequence diagram which illustrates exemplary processing of switching of operation from a spare wavelength to a working wavelength in the optical network system according to the second embodiment.

DESCRIPTION OF EMBODIMENTS

An object of the present invention is to provide an optical network system and an optical communication method that permit a reduction in maintenance and operation costs and an easy and assured recovery of an optical line in which a failure has occurred.

Embodiments of the present invention will now be described in detail with reference to the drawings.

<First Embodiment>

Figure 1:
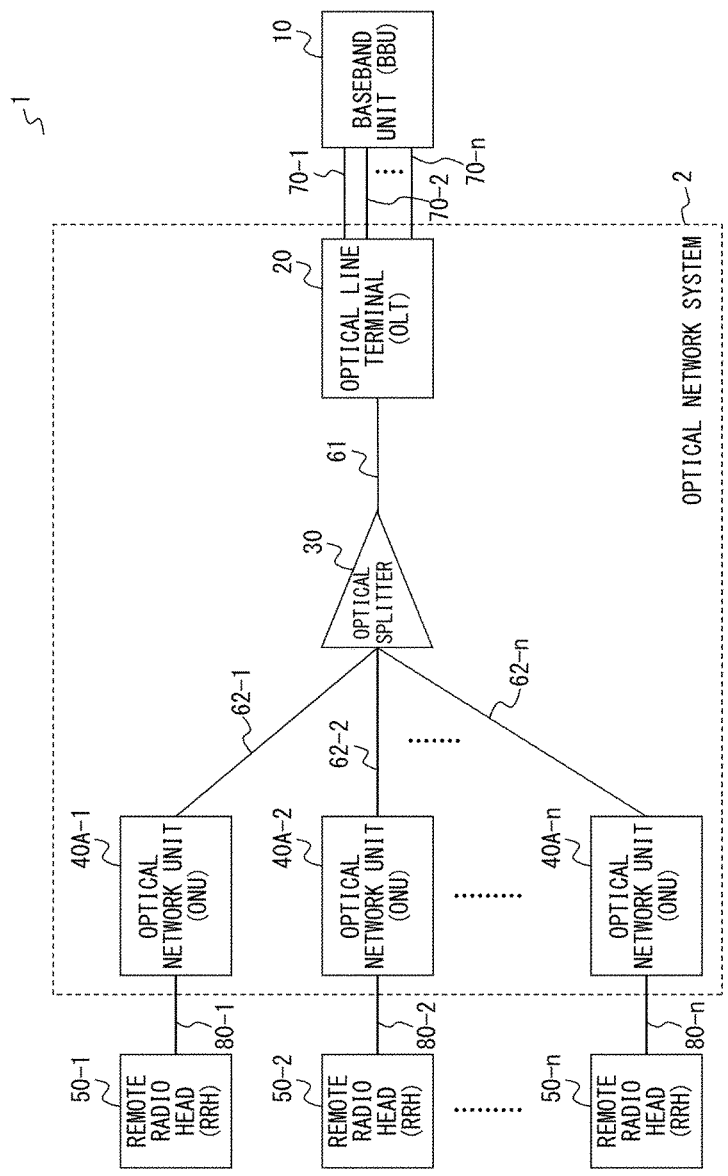
FIG. 1 is a block diagram which illustrates an exemplary communication system that includes an optical network system according to a first embodiment.

FIG. 1 is a block diagram which illustrates an exemplary communication system that includes an optical network system according to a first embodiment. As illustrated in FIG. 1, a communication system 1 includes a baseband unit (BBU) 10, an optical line terminal (OLT) 20, an optical splitter 30, n optical network units (ONU) 40A-1 to 40A-n, and n remote radio heads (RRH) 50-1 to 50-n. The optical network units (ONU) 40A-1 to 40A-n will hereinafter be referred to as an optical network unit 40A when they are not particularly distinguished. The remote radio heads (RRH) 50-1 to 50-n will hereinafter be referred to as a remote radio head 50 when they are not particularly distinguished. Further, the number n is an integer not less than 1 and corresponds to the number of optical network units 40A that are connected to the optical line terminal 20 via the optical splitter 30.

As illustrated in FIG. 1, the communication system 1 includes an optical network system 2 according to the first embodiment. The optical network system 2 has a PON configuration including a first optical fiber 61, the optical splitter 30, and second optical fibers 62-1 to 62-n between the optical line terminal 20 and the n optical network units 40A. The optical line terminal 20 is one optical line terminal in the optical network system 2, and the optical network unit 40A is the other. Further, the WDM technique is used for transmitting an optical signal between the optical line terminal 20 and the optical network unit 40A, as described below.

The baseband unit 10 is an example of a host unit that is connected to the optical line terminal 20. The baseband unit 10 is, for example, remote radio equipment (RRE) in a common public radio interface (CPRI) that standardizes an internal interface of a wireless base station. In the example illustrated in FIG. 1, the baseband unit is connected to the optical line terminal 20 via n first transmission paths 70-1 to 70-n. The first transmission paths 70-1 to 70-n will hereinafter be referred to as a first transmission path 70 when they are not particularly distinguished.

The n first transmission paths 70 each correspond to the respective n optical network units 40A. Each of the first transmission paths 70 may be a dual-core optical fiber that is configured by an optical fiber through which an optical signal is transmitted from the baseband unit 10 to the optical line terminal 20 and an optical fiber through which an optical signal is transmitted from the optical line terminal 20 to the baseband unit 10.

Differently from the configuration illustrated in FIG. 1, m relay units (m is an integer not less than 1 and not more than n) may be connected to the optical line terminal 20 via m first transmission paths 70 and (n-m) baseband units 10 may be connected to the optical line terminal 20 via (n-m) first transmission paths 70. The relay unit is another example of a host unit that is connected to the optical line terminal 20. A layer 2 switch is an example of the relay unit.

The baseband unit 10 receives a signal that is to be transmitted to the remote radio head 50 from an upper network (not shown). A core network of a wireless communication system such as a long term evolution (LTE) system and an internet protocol (IP) network are examples of the upper networks. The baseband unit 10 modulates the received signal into a digital baseband signal and transmits the modulated signal to the optical line terminal 20. Further, the baseband unit 10 receives a digital baseband signal from the optical line terminal 20. The baseband unit 10 demodulates the received digital baseband signal and transmits the demodulated signal to the upper network. Furthermore, the baseband unit 10 monitors and controls a failure of each unit in the wireless communication system 1.

The optical line terminal 20 is connected to the baseband unit 10 via the n first transmission paths 70. Further, the optical line terminal 20 is connected to the optical splitter 30 via one (single-core) first optical fiber 61.

The optical line terminal 20 receives signals that have each been transmitted from the baseband unit 10 via each of the first transmission paths 70 and converts each of the received signals into an optical signal. The optical line terminal 20 wavelength multiplexes the optical signals obtained by the conversion and transmits an optical signal obtained by the wavelength-multiplex to the optical splitter 30 via the first optical fiber 61.

Further, the optical line terminal 20 receives the multi-wavelength optical signal output from the optical splitter 30 via the first optical fiber 61. The optical line terminal 20 wavelength separates the received multi-wavelength optical signals into the optical signals transmitted by the respective optical network units 40A, and converts each of the wavelength-separated optical signals into an electric signal. The optical line terminal 20 reconverts the electric signals obtained by the conversion into an optical signal, and transmits the optical signals obtained by the reconversion to the baseband unit 10 via the corresponding first transmission paths 70. Alternatively, the optical line terminal 20 transmits the electric signals obtained by the conversion to the relay units described above via the corresponding first transmission paths 70.

The optical line terminal 20 may be connected to a computer for monitoring and controlling (not shown). The computer for monitoring and controlling may configure various settings for the optical line terminal 20 and the optical network unit 40A and monitor their states according to Telnet or a simple network management protocol (SNMP).

The optical splitter 30 is connected to the optical line terminal 20 via one (single-core) first optical fiber 61. Further, the optical splitter 30 is connected to the n optical network units 40A via n second optical fibers 62-1 to 62-n. The n second optical fibers 62-1 to 62-n each correspond to the respective n optical network units 40A. In this way, the optical line terminal 20 is connected to the n optical network units 40A via the optical splitter 30. The second optical fibers 62-1 to 62-n will hereinafter be referred to as a second optical fiber 62 when they are not particularly distinguished.

The multi-wavelength optical signal that has been transmitted from the optical line terminal 20 is input to the optical splitter 30 via the first optical fiber 61. The optical splitter 30 diverges the input multi-wavelength optical signal into n multi-wavelength optical signals. The optical splitter 30 outputs the diverged multi-wavelength optical signals to the n optical network units 40A, respectively.

Further, the optical signals that have been transmitted from the n optical network units 40A are input to the optical splitter 30 via the second optical fibers 62. The optical splitter 30 combines the input optical signals to generate a multi-wavelength optical signal, and outputs the generated multi-wavelength optical signal to the optical line terminal 20 via the first optical fiber 61.

The n optical network units 40A are connected to the optical splitter 30 via the corresponding second optical fibers 62, respectively. Further, the n optical network units 40A are connected to the n remote radio heads 50 via corresponding second transmission paths 80-1 to 80-n. The remote radio head 50 is an example of a sub-unit which is connected to the optical network unit 40A. The second transmission paths 80-1 to 80-n will hereinafter be referred to as a transmission path 80 when they are not particularly distinguished.

Differently from the configuration illustrated in FIG. 1, mother wireless communication units instead of m remote radio heads 50 may be connected to m optical network units 40A via m corresponding second transmission paths 80. A small base station such as a femto base station cell and a wireless local area network (LAN) access point are examples of the other wireless communication units. These other wireless communication units are other examples of sub-units that are connected to the optical network unit 40A.

The optical network unit 40A receives the multi-wavelength optical signal diverged by the optical splitter 30 via the second optical fiber 62. The optical network unit 40A extracts an optical signal of a reception wavelength assigned to itself from among the received multi-wavelength optical signal, and converts the extracted optical signal into an electric signal. The optical network unit 40A reconverts the electric signal obtained by the conversion into an optical signal, and transmits the optical signal obtained by the reconversion to the remote radio head 50 via the corresponding second transmission path 80. Alternatively, the optical network unit 40A transmits the electric signal obtained by the conversion to another wireless communication unit described above via the second transmission path 80.

The remote radio head 50 is, for example, radio equipment (RE) in a CPRI. The remote radio head 50 is connected to the optical network unit 40A via the second transmission path 80.

The remote radio head 50 receives an optical signal transmitted from the optical network unit 40A. The remote radio head 50 modulates the received signal into a radio signal and transmits the modulated signal to a wireless communication terminal (not shown) via a wireless line. A wireless communication terminal includes user equipment (UE) standardized by the Third Generation Partnership Project (3GPP), and is, for example, a cell phone or a handheld terminal. Further, the remote radio head 50 receives the radio signal transmitted from the wireless communication terminal. The remote radio head 50 demodulates the received radio signal and transmits the demodulated signal to the optical network unit 40A via the second transmission path 80.

In FIG. 1, the baseband unit 10 and the optical line terminal 20 are different units, but they may be configured to be one unit. Further, in FIG. 1, the optical network unit 40A and the remote radio head 50 are different units, but they may be configured to be one unit.

FIG. 2 is a hardware block diagram which illustrates an exemplary optical network system according to the first embodiment. As an example, FIG. 2 illustrates an optical network system 2 in which the number n of optical network units 40A that are connected to the optical line terminal 20 via the optical splitter 30 is eight (n=8).

As illustrated in FIG. 2, the optical line terminal 20 includes a central processing unit (CPU) 21, a dual directional coupler 22, an optical coupler 23, nine photoelectric conversion modules 24-1 to 24-9, a switch 25, and eight communication interfaces 26-1 to 26-8. The photoelectric conversion modules 24-1 to 24-9 will hereinafter be referred to as a photoelectric conversion module 24 when they are not particularly distinguished. The communication interfaces 26-1 to 26-8 will hereinafter be referred to as a communication interface 26 when they are not particularly distinguished.

As illustrated in FIG. 2, the number of photoelectric conversion modules 24 is nine, which is one more than the number n. From among the nine photoelectric conversion modules 24, the eight photoelectric conversion modules 24 are a component that covers a working wavelength, and the one photoelectric conversion module 24 is a component that covers a spare wavelength. A working wavelength indicates a transmission wavelength and a reception wavelength that is uniquely assigned to each optical network unit 40A connected to the optical line terminal 20 via the optical splitter 30. A spare wavelength indicates a transmission wavelength and a reception wavelength that is used for an optical signal transmitted between the optical line terminal 20 and the optical network unit 40A instead of a working wavelength. A spare wavelength is used, for example, when a failure occurs in a transmission or reception function in an optical network unit 40A that is in communication using a working wavelength.

The CPU 21 is a processor that is connected to each of the components 22 to 26 included in the optical line terminal 20 and that controls an entire operation of the optical line terminal 20. Further, the CPU 21 is connected to a computer 90 for monitoring and controlling that is arranged outside the optical line terminal 20. According to an instruction issued by the computer 90 for monitoring and controlling, the CPU 21 configures various settings for the optical line terminal 20 and the optical network unit 40A and monitors their states. Furthermore, according to an instruction issued by the computer 90 for monitoring and controlling, the CPU 21 transmits the various-settings data of the optical line terminal 20 and the optical network unit 40A and the monitoring data of their states to the computer 90 for monitoring and controlling.

The multi-wavelength optical signal output from the optical splitter 30 is input to the dual directional coupler 22 via the first optical fiber 61, and the input multi-wavelength optical signal is output to the optical coupler 23. In the example illustrated in FIG. 2, the multi-wavelength optical signal that is output from the optical splitter 30 and is input to the optical coupler 23 is a signal in which the optical signals of eight wavelengths from among the wavelengths $\lambda 1$ to $\lambda 9$ may be multiplexed.

Further, the multi-wavelength optical signal output from the optical coupler 23 is input to the dual directional coupler 22, and the input multi-wavelength optical signal is output to the optical splitter 30 via the first optical fiber 61. In the example illustrated in FIG. 2, the multi-wavelength optical signal that is output from the optical coupler 23 and is output to the optical splitter 30 is a signal in which the optical signals of eight wavelengths from among the wavelengths $\lambda 10$ to $\lambda 18$ may be multiplexed.

The optical coupler 23 wavelength separates the multi-wavelength optical signal output from the dual directional coupler 22 and outputs the wavelength-separated optical signals of each of the wavelengths to the photoelectric conversion modules 24 that cover the respective wavelengths. The optical signals wavelength-separated by the optical coupler 23 are optical signals transmitted from the respective optical network units 40A via the optical splitter 30, and are optical signals having different transmission wavelengths than one another.

Further, the optical coupler 23 wavelength multiplexes the optical signals having a different wavelength than one another that have been output from the photoelectric conversion modules 24, and outputs an optical signal obtained by the wavelength-multiplex to the dual directional coupler 22. The optical signals output from the photoelectric conversion modules 24 are optical signals received from the optical network units 40A via the optical splitter 30, and are optical signals having different reception wavelengths than one another.

The photoelectric conversion module 24 converts the optical signal of a particular wavelength output from the optical coupler 23 into an electric signal, and outputs the electric signal obtained by the conversion to the communication interface 26. The particular wavelength of the optical signal output from the optical coupler 23 is a transmission wavelength of the optical signal transmitted by the corresponding optical network unit 40A. Further, the photoelectric conversion module 24 converts the electric signal output from the communication interface 26 into an optical signal of a particular wavelength, and outputs the optical signal obtained by the conversion to the optical coupler 23. The particular wavelength of the optical signal obtained by the conversion is a reception wavelength of the optical signal received from the corresponding optical network unit 40A.

In the example of the optical line terminal 20 illustrated in FIG. 2, the photoelectric conversion module 24-1 converts the optical signal of a wavelength $\lambda 1$ output from the optical coupler 23 into an electric signal, and converts the electric signal output from the communication interface 26-1 into an optical signal of a wavelength $\lambda 10$. The photoelectric conversion module 24-2 converts the optical signal of a wavelength $\lambda 2$ output from the optical coupler 23 into an electric signal, and converts the electric signal output from the communication interface 26-2 into an optical signal of a wavelength $\lambda 11$. Likewise, the photoelectric conversion module 24-8 converts the optical signal of a wavelength $\lambda 8$ output from the optical coupler 23 into an electric signal, and converts the electric signal output from the communication interface 26-8 into an optical signal of a wavelength $\lambda 17$. Further, the photoelectric conversion module 24-9 converts the optical signal of a wavelength $\lambda 9$ output from the optical coupler 23 into an electric signal, and converts the electric signal output from any one of the communication interfaces 26-1 to 26-9 that are connected by the switch 25 into an optical signal of a wavelength $\lambda 18$.

The switch 25 switches the connection between the photoelectric conversion module 24 and the communication interface 26 in accordance with an instruction issued by the CPU 21. In the example illustrated in FIG. 2, instead of anyone of the photoelectric conversion modules 24-1 to 24-8, the photoelectric conversion module 24-9 is connected to the communication interface 26 by switching operation of the switch 25. Further, instead of the photoelectric conversion module 24-9, any one of the photoelectric conversion modules 24-1 to 24-8 can be connected to the communication interface 26 by switching operation of the switch 25.

As described above, in the example illustrated in FIG. 2, the photoelectric conversion modules 24-1 to 24-8 cover a working wavelength, and the photoelectric conversion module 24-9 covers a spare wavelength. Further, the wavelength λ9 is a spare wavelength of the optical signal transmitted by the optical network unit 40A to the optical line terminal 20, and the wavelength λ18 is a spare wavelength of the optical signal received by the optical network unit 40A from the optical line terminal 20.

The communication interface 26 may be removably mounted on the optical line terminal 20 in accordance with a communication protocol between the communication interface 26 and a host unit connected to the optical line terminal 20 via the first transmission path 70.

For example, the communication interface 26 receives the electric signal transmitted from the photoelectric conversion module 24 that is connected by the switch 25, converts the received electric signal into an optical signal of a predetermined type such as the CRPI, and transmits the optical signal obtained by the conversion to the baseband unit 10. Alternatively, the communication interface 26 receives the electric signal transmitted from the photoelectric conversion module 24 that is connected by the switch 25, converts the received electric signal into an optical signal of a predetermined type such as the Ethernet, and transmits the optical signal obtained by the conversion to a relay unit as described above.

Further, the communication interface 26 receives the optical signal transmitted from the baseband unit 10, converts the received optical signal into an electric signal, and transmits the electric signal obtained by the conversion to the corresponding photoelectric conversion module 24 that is connected by the switch 25. Alternatively, the communication interface 26 receives the electric signal transmitted from the relay unit, converts the received electric signal into an electric signal of a predetermined type to transmit it to the optical network unit 40A, and transmits the signal obtained by the conversion to the corresponding photoelectric conversion module 24 that is connected by the switch 25.

In FIG. 2, the eight optical network units 40A-1 to 40A-8 are a working optical network unit 40A in the optical network system 2. The optical network unit 40A-9 is a spare optical network unit 40A with which any one of the working optical network units 40A-1 to 40A-8 may be replaced. Unique working wavelengths that are different from one another are assigned to the respective working optical network units 40A. A spare wavelength is assigned to the spare optical network unit 40A.

In other words, combinations of a unique transmission wavelength λt and a unique reception wavelength λr (λt, λr) that are assigned to the optical network units 40A-1 to 40A-9 are different from one another. For example, a combination of wavelengths assigned to the optical network unit 40A-1 is (λ1, λ10), and a combination of wavelengths assigned to the optical network unit 40A-2 is (λ2, λ11). Likewise, a combination of wavelengths assigned to the optical network unit 40A-9 is (λ9, λ18).

FIG. 2 illustrates an exemplary hardware configuration of the optical network unit 40A-1. However, the optical network units 40A-2 to 40A-9 may have a similar hardware configuration to the optical network unit 40A-1, except that each of the components is configured to perform processing in response to the assigned combination of wavelengths.

As illustrated in FIG. 2, the optical network unit 40A includes a CPU 41, a dual directional coupler 42, an optical demultiplexer 43, a photoelectric conversion module 44, and a communication interface 45.

The CPU 41 is connected to each of the components 42 to 45 included in the optical network unit 40A, and is a processor that control an entire operation of the optical network unit 40A.

The multi-wavelength optical signal output from the optical splitter 30 is input to the dual directional coupler 42 via the second optical fiber 62, and the input multi-wavelength optical signal is output to the optical demultiplexer 43. The multi-wavelength optical signal that is output to the optical demultiplexer 43 is the multi-wavelength optical signal which the optical network unit 40A has received from the optical line terminal 20 via the optical splitter 30, and is a signal in which the optical signals of eight wavelengths from among the wavelengths λ10 to λ18 may be multiplexed.

Further, the optical signal of a transmission wavelength output from the photoelectric conversion module 44 is input to the dual directional coupler 42, and the input optical signal is output to the optical splitter 30 via the second optical fiber 62. For example, in the optical network unit 40A-1, the optical signal of a transmission wavelength output to the optical splitter 30 is an optical signal of a unique transmission wavelength λ1 assigned to the optical network unit 40A-1.

The multi-wavelength optical signal output from the dual directional coupler 42 is input to the optical demultiplexer 43. The optical demultiplexer 43 demultiplexes an optical signal of a unique reception wavelength from the input multi-wavelength optical signal and outputs the demultiplexed optical signal to the photoelectric conversion module 44. For example, in the optical network unit 40A-1, the optical signal of a unique reception wavelength λ10 assigned to the optical network unit 40A-1 is output from the optical demultiplexer 43 to the photoelectric conversion module 44.

The photoelectric conversion module 44 receives the optical signal of the unique reception wavelength output from the optical demultiplexer 43, converts the received optical signal into an electric signal, and transmits the electric signal obtained by the conversion to the communication interface 45. Further, the photoelectric conversion module 44 receives the electric signal transmitted from the communication interface 45, converts the received electric signal into an optical signal of a unique transmission wavelength assigned to its optical network unit 40A, and transmits the optical signal obtained by the conversion to the dual directional coupler 42.

The communication interface 45 may be mounted on the optical network unit 40A in accordance with a communication protocol between the optical network unit 40A and a sub-unit connected to the optical network unit 40A via the second transmission path 80.

For example, the communication interface 45 receives the electric signal transmitted from the photoelectric conversion module 44, converts the received electric signal into an optical signal of a predetermined type such as the CRPI, and transmits the optical signal obtained by the conversion to the remote radio head 50. Alternatively, the communication interface 45 receives the electric signal transmitted from the photoelectric conversion module 44, converts the received electric signal into an optical signal of a predetermined type such as the Ethernet, and transmits the optical signal obtained by the conversion to another wireless communication unit as described above.

Further, the communication interface 45 receives the optical signal transmitted from the remote radio head 50, converts the received optical signal into an electric signal, and transmits the electric signal obtained by the conversion to the photoelectric conversion module 44. Alternatively, the communication interface 45 receives the electric signal transmitted from another wireless communication unit, converts the received electric signal into an electric signal of a predetermined type to transmit it to the optical line terminal 20, and transmits the signal obtained by the conversion to the photoelectric conversion module 44.

As described above, the optical line terminal 20 in the optical network system 2 according to the first embodiment includes a component covering a spare wavelength to which any one of a plurality of working wavelengths may be switched, in addition to components covering the plurality of working wavelengths. Further, in the optical line terminal 20, an operation can be switched from the operation using a component covering a working wavelength to the operation using a component covering a spare wavelength. The spare optical network unit 40A is a spare unit that is common to a plurality of working optical network units 40A in the optical network system 2, and with which any one of the plurality of working optical network units 40A may be replaced.

Thus, the optical network system according to the first embodiment permits standardizing of a spare unit for a plurality of optical network units that have been assigned different combinations of wavelengths than one another, so as to considerably reduce a manufacturing cost of the spare unit and maintenance and operation costs of the optical network units. In other words, compared to the case in which spare units are respectively provided for n optical network units that are assigned n combinations of wavelengths, a manufacturing cost of a spare unit and maintenance and operation costs of an optical network can be reduced to 1/n.

Further, the optical network system according to the first embodiment permits a rapid and efficient replacement with a spare unit and an easy and assured recovery of an optical line in which a failure has occurred because of a standardization of a spare unit for a plurality of optical network units. Furthermore, an error in maintenance such as a mistaken replacement with a different type of spare unit can be prevented, and therefore a failure in the presently used line due to the error in maintenance can be prevented, with the result that it is possible to improve the reliability of an entire optical network system.

Moreover, when a failure has occurred in a component covering a certain combination of wavelengths in an optical line terminal, the operation in the optical line terminal can be changed to the operation of a component covering a spare wavelength by replacing the corresponding optical network unit with a spare unit. Thus, the optical network system according to the first embodiment permits a rapid and efficient recovery of an optical network system.

An example of processing of switching of operation between a working wavelength and a spare wavelength in the optical network system. 2 according to the first embodiment will now be described with reference to FIGS. 3 to 5. As an example, a case in which the optical network system 2 is included in the communication system 1 illustrated in FIG. 1 will be described below.

Figure 3:
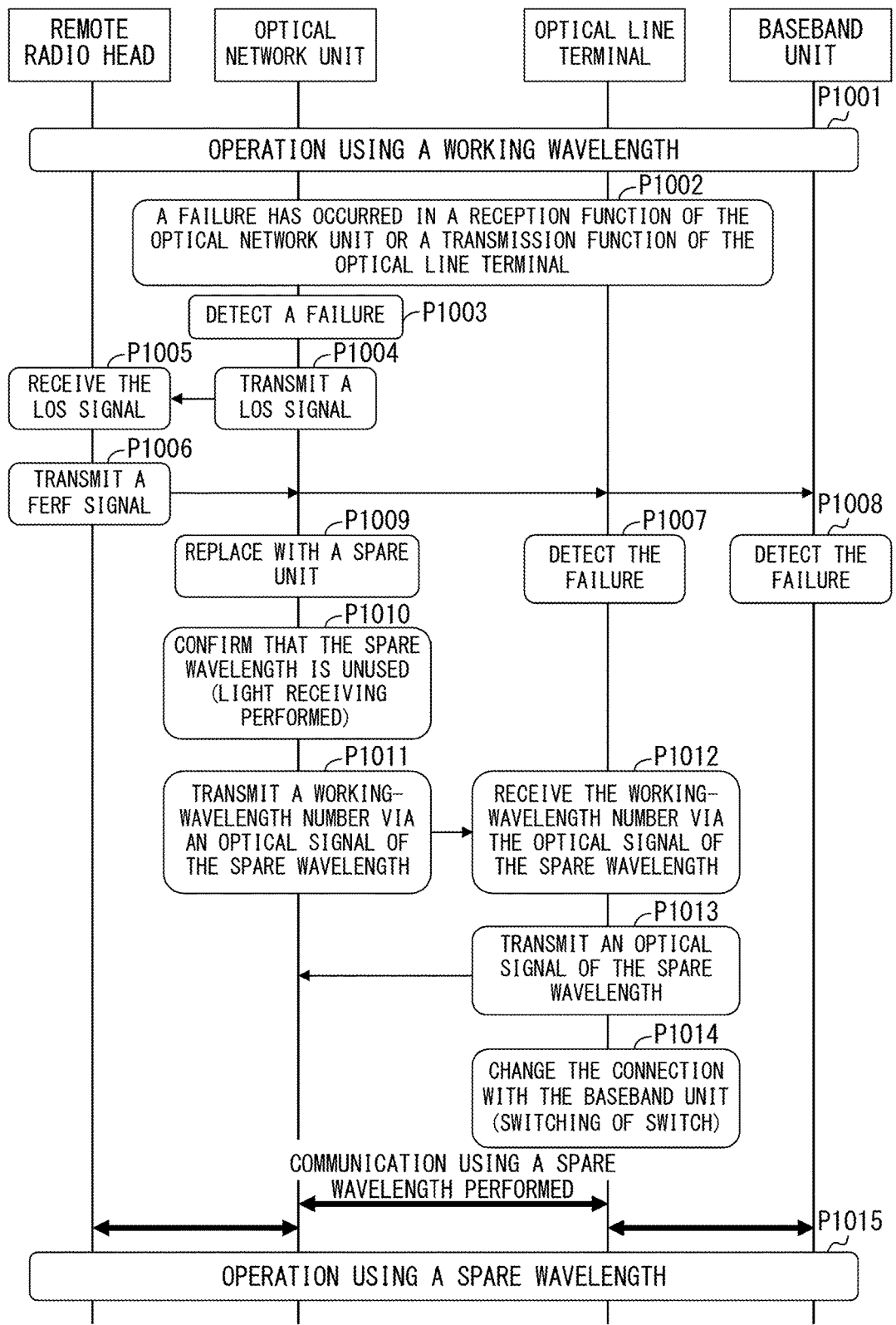
FIG. 3 is a sequence diagram which illustrates exemplary processing of switching of operation from a working wavelength to a spare wavelength in the optical network system according to the first embodiment in a first case.

FIG. 3 is a sequence diagram which illustrates exemplary processing of switching of operation from a working wavelength to a spare wavelength in the optical network system according to the first embodiment in a first case. The first case illustrated in FIG. 3 is a case in which a failure has occurred in a reception function of the optical network unit 40A or a transmission function of the optical line terminal 20. The failure in the reception function of the optical network unit 40A or the transmission function of the optical line terminal 20 will hereinafter be referred to as a failure 1 for convenience.

In Process P1001, a working wavelength (a transmission wavelength and a reception wavelength) uniquely assigned to the optical network unit 40A is used for an optical signal transmitted and received between the optical line terminal 20 and the optical network unit 40A, and a communication is performed between the baseband unit 10 and the remote radio head 50.

When a failure 1 has occurred during an operation in Process P1001 (Process P1002), the CPU 41 of the optical network unit 40A determines that a signal level of the optical signal of the working wavelength transmitted from the optical line terminal 20, that is, a signal level of the optical signal of the reception wavelength, is not greater than a predetermined threshold, and detects the failure 1 (Process P1003). The CPU 41 generates a loss-of-signal (LOS) signal on the basis of the detection of the failure 1 and transmits the generated loss-of-signal signal to the remote radio head 50 via the communication interface 45 (Process P1004).

The remote radio head 50 receives the loss-of-signal signal transmitted from the optical network unit 40A (Process P1005). The remote radio head 50 generates a far-end receive failure (FERF) signal on the basis of the received loss-of-signal signal and transmits the generated far-end receive failure signal to the baseband unit 10 (Process P1006). The far-end receive failure signal transmitted from the remote radio head 50 is transmitted to the baseband unit 10 via the optical network unit 40A and the optical line terminal 20.

The CPU 21 of the optical line terminal 20 receives the far-end receive failure signal transmitted from the remote radio head 50 via the dual directional coupler 22, the optical coupler 23, and the photoelectric conversion module 24. The CPU 21 detects the failure 1 by the received far-end receive failure signal (Process P1007). The CPU 21 generates a failure detection alarm signal and transmits the generated failure detection alarm signal to the computer 90 for monitoring and controlling. Further, the CPU 21 transfers the received far-end receive failure signal to the baseband unit 10 via the communication interface 26.

The baseband unit 10 receives the far-end receive failure signal transferred from the optical line terminal 20 and detects the failure 1 on the basis of the received far-end receive failure signal (Process P1008). The baseband unit 10 generates a failure detection alarm signal and transmits the generated failure detection alarm signal to maintenance equipment (not shown) via an upper network.

The optical network unit 40A corresponding to the failure 1 is determined by the failure detection alarm signal transmitted to the computer 90 for monitoring and controlling and to the maintenance equipment. A maintainer replaces the determined optical network unit 40A in operation with a spare optical network unit 40A (Process P1009). As described above, a spare wavelength, that is, a spare transmission wavelength and a spare reception wavelength, is assigned to the spare optical network unit 40A.

A CPU 41 of the spare optical network unit 40A confirms whether the spare wavelength is in an unused state by measuring a light-receiving level of the spare reception wavelength via the dual directional coupler 42 and the optical demultiplexer 43 (Process P1010). As described above, a plurality of optical network units 40A in operation may be replaced with the spare optical network unit 40A in common. Thus, another optical network unit 40A having a similar configuration may already be being used in the optical network system 2 and then there may already be an optical line in the optical network system 2 in which the spare wavelength is used. The plurality of optical network units 40A may be installed away from one another, so it is not easy and it takes time to confirm whether another spare optical network unit 40A is already being used. So, performing Process 1010 permits preventing of communication failure that is caused when the spare wavelength is redundantly used by a plurality of optical lines. When the light-receiving level of the spare reception wavelength is not greater than a predetermined threshold in Process P1010, it is confirmed that an optical output of the spare reception wavelength is stopped, that is, that the spare wavelength is in an unused state.

When it has been confirmed that the spare wavelength is in an unused state in Process P1010, the CPU 41 transmits to the optical line terminal 20 a wavelength number (data) that indicates a working wavelength to be replaced with the spare wavelength by use of an optical signal of the spare transmission wavelength (Process P1011). A working wavelength and a spare wavelength are each given a corresponding wavelength number in advance, and information that represents a correspondence relationship between a working wavelength, a spare wavelength, and their wavelength numbers is shared by the optical network unit 40A and the optical line terminal 20. The CPU 41 can determine a working wavelength to be replaced with a spare wavelength from, for example, types of second optical fiber 62 and second transmission path 80 that are connected to the spare optical network unit 40A.

The CPU 21 of the optical line terminal 20 receives the wavelength number of the working wavelength transmitted from the spare optical network unit 40A via the dual directional coupler 22, the optical coupler 23, and a photoelectric conversion module 24 covering a spare wavelength (Process P1012).

The CPU 21 transmits an optical signal of the spare wavelength to the optical network unit 40A via the photoelectric conversion module 24 covering a spare wavelength, the optical coupler 23, and the dual directional coupler 22 (Process P1013). The spare wavelength of the optical signal transmitted from the optical line terminal 20 corresponds to the reception wavelength of the spare optical network unit 40A.

The CPU 21 operates the switch 25 so as to switch a photoelectric conversion module 24 connected to the communication interface 26 from the photoelectric conversion module 24 covering the working wavelength indicated by the received wavelength number to the photoelectric conversion module 24 covering a spare wavelength (Process P1014). In this way, the optical line terminal 20 can determine a working wavelength to be switched to a spare wavelength by referring to the received wavelength number, with the result that it can switch from the working wavelength to the spare wavelength automatically and without error.

When the processing up to Process P1014 is completed, an optical line in which the spare wavelength is used between the replaced spare optical network unit 40A and the optical line terminal 20 is established. Further, a line between the optical line terminal 20 that has been switched to cover a spare wavelength and the baseband unit 10, and a line between the spare optical network unit 40A and the remote radio head 50 are established. Then, the spare wavelength (the spare transmission wavelength and the spare reception wavelength) is used for an optical signal transmitted and received between the optical line terminal 20 and the spare optical network unit 40A, and a communication is performed between the baseband unit 10 and the remote radio head 50 (Process P1015).

Figure 4:
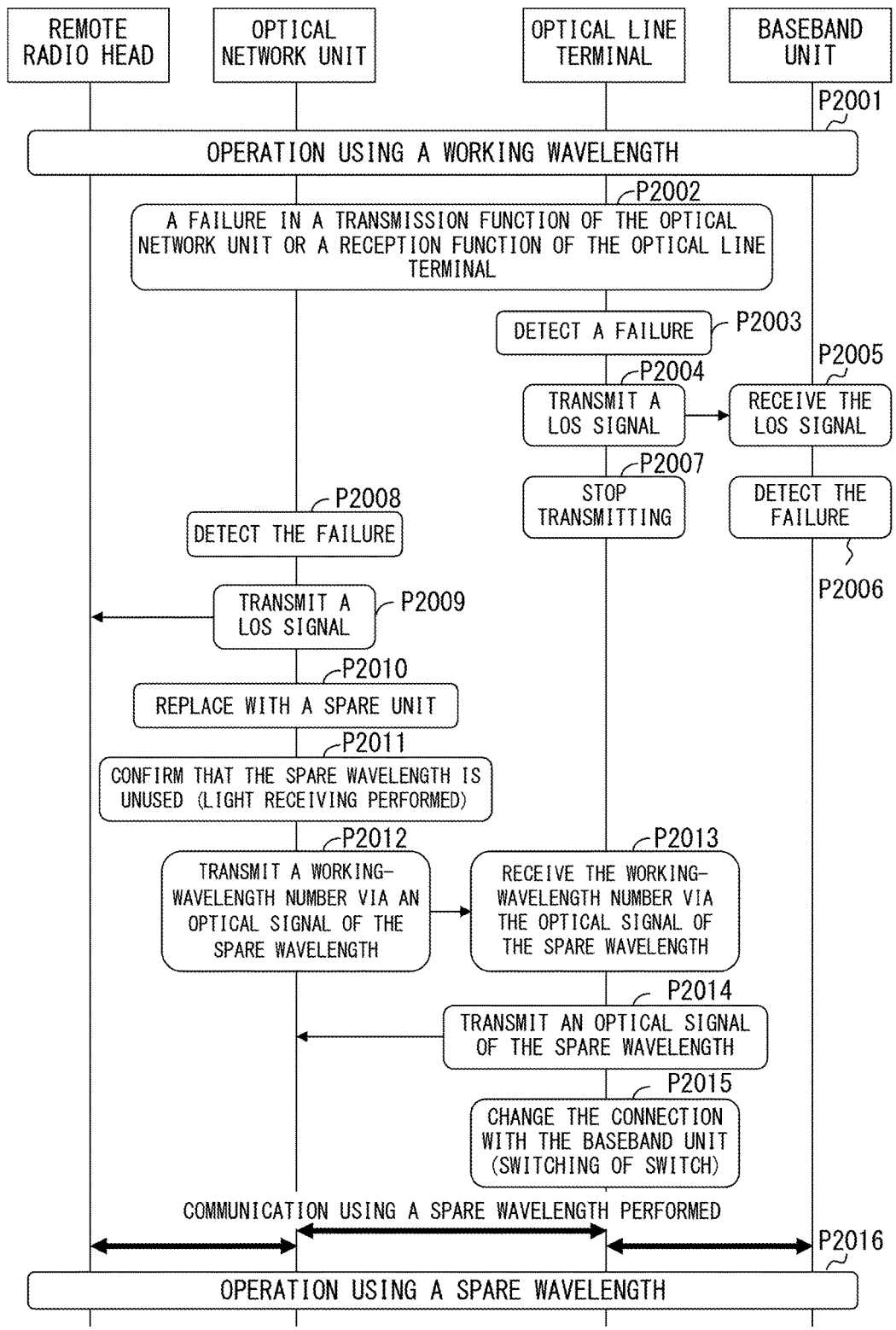
FIG. 4 is a sequence diagram which illustrates exemplary processing of switching of operation from a working wavelength to a spare wavelength in the optical network system according to the first embodiment in a second case.

FIG. 4 is a sequence diagram which illustrates exemplary processing of switching of operation from a working wavelength to a spare wavelength in the optical network system according to the first embodiment in a second case. The second case illustrated in FIG. 4 is a case in which a failure has occurred in a transmission function of the optical network unit 40A or a reception function of the optical line terminal 20. The failure in the transmission function of the optical network unit 40A or the reception function of the optical line terminal 20 will hereinafter be referred to as a failure 2 for convenience.

In Process P2001, a working wavelength (a transmission wavelength and a reception wavelength) uniquely assigned to the optical network unit 40A is used for an optical signal transmitted and received between the optical line terminal 20 and the optical network unit 40A, and a communication is performed between the baseband unit 10 and the remote radio head 50.

When a failure 2 has occurred during an operation in Process P2001 (Process P2002), the CPU 21 of the optical line terminal 20 determines that a signal level of the optical signal of the working wavelength transmitted from the optical network unit 40A, that is, a signal level of the optical signal of the transmission wavelength, is not greater than a predetermined threshold, and detects the failure 2 (Process P2003). The CPU 21 generates a failure detection alarm signal on the basis of the detection of the failure 2 and transmits the generated failure detection alarm signal to the computer 90 for monitoring and controlling. Further, the CPU 21 generates a loss-of-signal signal on the basis of the detection of the failure 2 and transmits the generated loss-of-signal signal to the baseband unit 10 via the communication interface 26 (Process P2004).

The baseband unit 10 receives the loss-of-signal signal transmitted from the optical line terminal 20 (Process P2005) and detects the failure 2 on the basis of the received loss-of-signal signal (Process P2006). The baseband unit 10 generates a failure detection alarm signal and transmits the generated failure detection alarm signal to maintenance equipment (not shown) via an upper network.

The CPU 21 of the optical line terminal 20 operates the photoelectric conversion module 24 that covers the working wavelength in which the failure 2 has been detected, and stops an optical output of the working wavelength of the optical signal that is received by the optical network unit 40A, that is, an optical output of a reception wavelength (Process P2007). When the optical output of a reception wavelength is stopped, the CPU 41 of the optical network unit 40A determines that a signal level of the optical signal of the working wavelength transmitted from the optical line terminal 20, that is, a signal level of the optical signal of the reception wavelength, is not greater than a predetermined threshold, and detects the failure 2 (Process P2008). The CPU 41 generates a loss-of-signal signal and transmits the generated loss-of-signal signal to the remote radio head 50 via the communication interface 45 (Process P2009).

The optical network unit 40A corresponding to the failure 2 is determined by the failure detection alarm signal transmitted to the computer 90 for monitoring and controlling and to the maintenance equipment. A maintainer replaces the determined optical network unit 40A in operation with a spare optical network unit 40A (Process P2010).

The CPU 41 of the spare optical network unit 40A confirms whether the spare wavelength is in an unused state by measuring a light-receiving level of the spare reception wavelength via the dual directional coupler 42 and the optical demultiplexer 43 (Process P2011). When it has been confirmed that the optical output of the spare reception wavelength is stopped and that the spare wavelength is in an unused state, the CPU 41 transmits to the optical line terminal 20 the wavelength number that indicates a working wavelength to be replaced with the spare wavelength by use of an optical signal of the spare transmission wavelength (Process P2012).

The CPU 21 of the optical line terminal 20 receives the wavelength number of the working wavelength transmitted from the spare optical network unit 40A via the dual directional coupler 22, the optical coupler 23, and the photoelectric conversion module 24 covering a spare wavelength (Process P2013). The CPU 21 transmits an optical signal of the spare wavelength to the optical network unit 40A via the photoelectric conversion module 24 covering a spare wavelength, the optical coupler 23, and the dual directional coupler (Process P2014). The spare wavelength of the optical signal transmitted from the optical line terminal 20 corresponds to the reception wavelength of the spare optical network unit 40A. The CPU 21 operates the switch 25 so as to switch a photoelectric conversion module 24 connected to the communication interface 26 from the photoelectric conversion module 24 covering the working wavelength indicated by the received wavelength number to the photoelectric conversion module 24 covering a spare wavelength (Process P2015).

When the processing up to Process P2015 is completed, an optical line in which the spare wavelength is used between the replaced spare optical network unit 40A and the optical line terminal 20 is established. Further, a line between the optical line terminal 20 that has been switched to cover a spare wavelength and the baseband unit 10, and a line between the spare optical network unit 40A and the remote radio head 50 are established. Then, the spare wavelength (the spare transmission wavelength and the spare reception wavelength) is used for an optical signal transmitted and received between the optical line terminal 20 and the spare optical network unit 40A, and a communication is performed between the baseband unit 10 and the remote radio head 50 (Process P2016).

FIG. 5 is a sequence diagram which illustrates exemplary processing of switching of operation from a spare wavelength to a working wavelength in the optical network system according to the first embodiment. The exemplary switching processing sequence illustrated in FIG. 5 may be performed, for example, when an optical network unit 40A that has been replaced due to the failure 1 or 2 is repaired and then a spare optical network unit 40A is replaced with the repaired optical network unit 40A.

In Process P3001, a spare wavelength (a spare transmission wavelength and a spare reception wavelength) is used for an optical signal transmitted and received between the optical line terminal 20 and the spare optical network unit 40A, and a communication is performed between the baseband unit 10 and the remote radio head 50.

During an operation in Process P3001, a maintainer stops a light-receiving function of the spare optical network unit 40A such as the optical demultiplexer 43 in order to replace it with the repaired former optical network unit 40A (Process P3002). A CPU 41 of the spare optical network unit 40A determines that a signal level of the optical signal of the spare wavelength transmitted from the optical line terminal 20, that is, a signal level of the optical signal of the reception wavelength, is not greater than a predetermined threshold, and detects the failure 1 (Process P3003). The failure 1 detected in Process P3003 was intentionally caused by the maintainer in order to replace it with the repaired former optical network unit 40A, and indicates that the processing of switching of operation from a spare wavelength to a working wavelength is being performed, that is, it is in a switching-processing state. The CPU 41 generates a loss-of-signal signal and transmits the generated loss-of-signal signal to the remote radio head 50 via the communication interface 45 (Process P3004).

The remote radio head 50 receives the loss-of-signal signal transmitted from the optical network unit 40A (Process P3005). The remote radio head 50 generates a far-end receive failure signal on the basis of the received loss-of-signal signal, and transmits the generated far-end receive failure signal to the baseband unit 10 (Process P3006).

The CPU 21 of the optical line terminal 20 receives the far-end receive failure signal transmitted from the remote radio head 50 via the dual directional coupler 22, the optical coupler 23, and the photoelectric conversion module 24 covering a spare wavelength. The CPU 21 detects the failure 1, that is, a switching-processing state, on the basis of the received far-end receive failure signal (Process P3007). The CPU 21 generates a failure detection alarm signal and transmits the failure detection alarm signal to the computer 90 for monitoring and controlling. Further, the CPU 21 transfers the received far-end receive failure signal to the baseband unit 10 via the communication interface 26.

The baseband unit 10 receives the far-end receive failure signal transferred from the optical line terminal 20 and detects the failure 1, that is, a switching-processing state, on the basis of the received far-end receive failure signal (Process P3008). The baseband unit 10 generates a failure detection alarm signal and transmits the generated failure detection alarm signal to maintenance equipment (not shown) via an upper network.

The maintainer can recognize from the failure detection alarm signal that has been transmitted to the computer 90 for monitoring and controlling and to the maintenance equipment that the processing of switching of operation is being performed normally. The spare optical network unit 40A is replaced by the maintainer with the repaired former optical network unit 40A (Process P3009). The replaced former optical network unit 40A is assigned the same working wavelength as before being repaired, that is, the unique transmission wavelength and the unique reception wavelength.

The CPU 41 of the replaced former optical network unit 40A confirms whether the working wavelength is in an unused state by measuring a light-receiving level of the working reception wavelength via the dual directional coupler 42 and the optical demultiplexer 43 (Process P3010). When it has been confirmed that the working wavelength is in an unused state, the CPU 41 transmits an optical signal of the working wavelength to the optical line terminal 20 (Process P3011).

The CPU 21 of the optical line terminal 20 receives the optical signal of the working wavelength transmitted from the replaced former optical network unit 40A via the dual directional coupler 22, the optical coupler 23, and a photoelectric conversion module 24 covering a working wavelength (Process P3012). The wavelength number of the working wavelength to be switched from the spare wavelength is indicated in the received optical signal.

The CPU 21 transmits the optical signal of the working wavelength via the photoelectric conversion module 24 covering the working wavelength indicated by the received wavelength number, the optical coupler 23, and the dual directional coupler 22 to the optical network unit 40A (Process P3013). The working wavelength of the optical signal transmitted from the optical line terminal 20 corresponds to the reception wavelength uniquely assigned to the replaced former optical network unit 40A.

CPU 21 operates the switch 25 so as to switch a photoelectric conversion module 24 connected to the communication interface 26 from the photoelectric conversion module 24 covering a spare wavelength to the photoelectric conversion module 24 covering the working wavelength indicated by the received wavelength number (Process P3014). Then, the CPU 21 operates the photoelectric conversion module 24 covering a spare wavelength, and stops an optical output of the spare wavelength (Process P3015) so that the spare wavelength is in an unused state. In this way, the optical line terminal 20 can determine a working wavelength to be switched by referring to the received wavelength number, with the result that it can switch from a spare wavelength to the working wavelength automatically and without error.

When the processing up to Process P3015 is completed, an optical line in which the working wavelength is used between the replaced former optical network unit 40A and the optical line terminal 20 is established. Further, a line between the optical line terminal 20 that has been switched to cover a working wavelength and the baseband unit 10, and a line between the replaced former optical network unit 40A and the remote radio head 50 are established. Then, the working wavelength (the unique transmission wavelength and the unique reception wavelength) is used for an optical signal transmitted and received between the optical line terminal 20 and the optical network unit 40A, and a communication is performed between the baseband unit 10 and the remote radio head 50 (Process P3016).

As described above, the optical communication method using the optical network system according to the first embodiment permits a considerable reduction in a manufacturing cost of a spare unit and in maintenance and operation costs of optical network units because a spare unit for a plurality of optical network units that have been assigned different combinations of wavelengths than one another is standardized.

Further, the optical communication method using the optical network system according to the first embodiment permits a rapid and efficient replacement with a spare unit and an easy and assured recovery of an optical line in which a failure has occurred because of a standardization of a spare unit for a plurality of optical network units. Furthermore, an error in maintenance such as a mistaken replacement with a different type of spare unit can be prevented, and therefore a failure in the presently used line due to the error in maintenance can be prevented, with the result that it is possible to improve the reliability of an entire optical network system.

Moreover, when a failure has occurred in a component covering a certain combination of wavelengths in an optical line terminal, the operation in the optical line terminal can be changed to the operation using a component covering a spare wavelength by replacing the corresponding optical network unit with a spare unit. Thus, the optical communication method using the optical network system according to the first embodiment permits a rapid and efficient recovery of an optical network system.

<Second Embodiment>

The optical network system according to the first embodiment is provided with a spare optical network unit that is common to a plurality of working optical network units, in addition to the plurality of working optical network units that are connected to an optical line terminal via an optical splitter. Then, one of the plurality of working optical network units and the spare optical network unit may be replaced with each other.

On the other hand, in an optical network system according to a second embodiment, a plurality of working optical network units are each configured so that a working wavelength uniquely assigned to an optical network unit and a spare wavelength that is common to the plurality of optical network units can be used selectively.

FIG. 6 is a hardware block diagram which illustrates an exemplary optical network system according to the second embodiment. Each component in the optical network system 3 illustrated in FIG. 6 bears the same reference numeral as the same component in the optical network system 2 illustrated in FIG. 2. Instead of the optical network system 2, the optical network system 3 may be included in the communication system 1 as illustrated in FIG. 1. As an example, FIG. 6 illustrates an optical network system 3 in which the number n of optical network units 40B that are connected to the optical line terminal 20 via the optical splitter 30 is eight (n=8).

As illustrated in FIG. 6, like the optical network system 2, the optical network system 3 includes the optical line terminal 20 and the optical splitter 30. The optical network system 3 further includes the optical network unit 40B instead of the optical network unit 40A.

FIG. 6 illustrates an exemplary hardware configuration of the optical network unit 40B-1 from among eight optical network units 40B. However, the optical network units 40B-2 to 40B-8 may have a similar hardware configuration to the optical network unit 40B-1 except that each of the components is configured to perform processing in response to the assigned combination of wavelengths.

The optical network unit 40B includes the CPU 41, the dual directional coupler 42, the optical demultiplexer 43, the photoelectric conversion module 44, the communication interface 45, a photoelectric conversion module 46 for a spare wavelength, an optical multiplexer 47, and a switch 48.

The CPU 41 is connected to each of the components 42 to 48 included in the optical network unit 40B, and is a processor that controls an entire operation of the optical network unit 40B.

The multi-wavelength optical signal output from the optical splitter 30 is input to the dual directional coupler 42 via the second optical fiber 62, and the input multi-wavelength optical signal is output to the optical demultiplexer 43. The multi-wavelength optical signal that is output to the optical demultiplexer 43 is the multi-wavelength optical signal which the optical network unit 40A has received from the optical line terminal 20 via the optical splitter 30, and is a signal in which the optical signals of eight wavelengths from among the wavelengths $\lambda 10$ to $\lambda 18$ may be multiplexed.

Further, the optical signal of a transmission wavelength output from the optical multiplexer 47 is input to the dual directional coupler 42, and the input optical signal is output to the optical splitter 30 via the second optical fiber 62. For example, in the optical network unit 40B-1, the optical signal of a transmission wavelength output to the optical splitter 30 is an optical signal of a unique transmission wavelength $\lambda 1$ assigned to the optical network unit 40B-1 or an optical signal of a spare transmission wavelength $\lambda 9$ that is common to the optical network units 40B-1 to 40B-8.

The multi-wavelength optical signal output from the dual directional coupler 42 is input to the optical demultiplexer 43. The optical demultiplexer 43 demultiplexes it into an optical signal of a unique reception wavelength assigned to its optical network unit 40B and an optical signal of a spare wavelength that is common to the optical network units 40B-1 to 40B-8. The optical signal of the unique reception wavelength obtained by the demultiplexing is output from the optical demultiplexer 43 to the photoelectric conversion module 44, and the optical signal of the spare wavelength obtained by the demultiplexing is output from the optical demultiplexer 43 to the photoelectric conversion module 46 for a spare wavelength. For example, in the optical network unit 40B-1, the optical signal of a unique reception wavelength $\lambda 10$ assigned to the optical network unit 40B-1 is output from the optical demultiplexer 43 to the photoelectric conversion module 44. Further, the optical signal of a spare wavelength $\lambda 18$ that is common to the optical network units 40B-1 to 40B-8 is output from the optical demultiplexer 43 to the photoelectric conversion module 46 for a spare wavelength.

The optical signal output from the photoelectric conversion module 44 or the optical signal output from the photoelectric conversion module 46 for a spare wavelength is input to the optical multiplexer 47. The optical multiplexer 47 outputs the input optical signal to the dual directional coupler 42. For example, in the optical network unit 40B-1, an optical signal of a unique transmission wavelength $\lambda 1$ assigned to the optical network unit 40B-1 is output from the optical multiplexer 47 to the dual directional coupler 42. Further, the optical signal of a spare transmission wavelength $\lambda 9$ that is common to the optical network units 40B-1 to 40B-8 is output from the optical multiplexer 47 to the dual directional coupler 42.

The photoelectric conversion module 44 receives the optical signal of the unique reception wavelength output from the optical demultiplexer 43, converts the received optical signal into an electric signal, and transmits the electric signal obtained by the conversion to the communication interface 45 via the switch 48. Further, the photoelectric conversion module 44 receives the electric signal transmitted from the communication interface 45 via the switch 48, converts the received electric signal into an optical signal of a unique transmission wavelength assigned to its optical network unit 40B, and transmits the optical signal obtained by the conversion to the optical multiplexer 47.

The photoelectric conversion module 46 for a spare wavelength receives the optical signal of the spare reception wavelength output from the optical demultiplexer 43, converts the received optical signal into an electric signal, and transmits the electric signal obtained by the conversion to the communication interface 45 via the switch 48. Further, the photoelectric conversion module 46 for a spare wavelength receives the electric signal transmitted from the communication interface 45 via the switch 48, converts the received electric signal into an optical signal of a spare transmission wavelength, and transmits the optical signal obtained by the conversion to the optical multiplexer 47.

The switch 48 switches between the connection of the communication interface 45 with the photoelectric conversion module 44 and the connection of the communication interface 45 with the photoelectric conversion module 46 for a spare wavelength in accordance with an instruction issued by the CPU 41. For example, in the optical network unit 40B-1, instead of the photoelectric conversion module 44 corresponding to unique wavelengths $\lambda 1$ and $\lambda 10$, the photoelectric conversion module 46 for a spare wavelength corresponding to spare wavelengths $\lambda 9$ and $\lambda 18$ is connected to the communication interface 45 by switching operation of the switch 48. Further, instead of the photoelectric conversion module 46 for a spare wavelength, the photoelectric conversion module 44 is connected to the communication interface 45 by switching operation of the switch 48.

The communication interface 45 may be mounted on the optical network unit 40B in accordance with a communication protocol between the communication interface 45 and a sub-unit connected to the optical network unit 40B via the second transmission path 80.

For example, the communication interface 45 converts the electric signal output from the photoelectric conversion module 44 or the photoelectric conversion module 46 for a spare wavelength that is connected by the switch 48 into an optical signal of a predetermined type such as the CRPI, and transmits the optical signal obtained by the conversion to the remote radio head 50. Alternatively, the communication interface 45 converts the electric signal output from the photoelectric conversion module 44 or the photoelectric conversion module 46 for a spare wavelength that is connected by the switch 48, into an optical signal of a predetermined type such as the Ethernet, and transmits the optical signal obtained by the conversion to another wireless communication unit.

Further, the communication interface 45 converts the optical signal transmitted from the remote radio head 50 into an electric signal, and transmits the electric signal obtained by the conversion to the photoelectric conversion module 44 or the photoelectric conversion module 46 for a spare wavelength that is connected by the switch 48. Alternatively, the communication interface 45 converts the electric signal transmitted from another wireless communication unit into an electric signal of a predetermined type to transmit it to the optical line terminal 20, and transmits the signal obtained by the conversion to the photoelectric conversion module 44 or the photoelectric conversion module 46 for a spare wavelength that is connected by the switch 48.

As described above, the optical line terminal 20 in the optical network system 3 according to the second embodiment includes a component covering a spare wavelength to which any one of a plurality of working wavelengths may be switched, in addition to components covering the plurality of working wavelengths. Further, in the optical line terminal 20, an operation can be switched from the operation using a component covering a working wavelength to the operation using a component covering a spare wavelength. The optical network unit 40B is a unit that can cover the working wavelength uniquely assigned to itself and the spare wavelength that is common to a plurality of working optical network units 40B in the optical network system 3. Furthermore, in any one of the plurality of working optical network units 40B, the wavelength of the transmitted and received optical signal can be changed from the unique working wavelength to the spare wavelength by switching operation of the switch 48.

Thus, the optical network system according to the second embodiment permits standardizing of a spare component for a plurality of optical network units that have been assigned different combinations of wavelengths than one another, so as to considerably reduce a manufacturing cost of the spare component and maintenance and operation costs of the optical network units. In other words, compared to the case in which spare components are respectively provided for n optical network units that are assigned n combinations of wavelengths, a manufacturing cost of a spare component and maintenance and operation costs of an optical network can be reduced to 1/n.

Further, the optical network system according to the second embodiment permits a rapid and efficient replacement with a spare component and an easy and assured recovery of an optical line in which a failure has occurred because of a standardization of a spare component for a plurality of optical network units. Furthermore, an error in maintenance such as a mistaken replacement with a different type of spare component can be prevented, and therefore a failure such as a disconnection of the presently used line due to the error in maintenance can be prevented, with the result that it is possible to improve the reliability of an entire optical network system.

Moreover, when a failure has occurred in a component covering a certain combination of wavelengths in an optical line terminal, the operation in the optical line terminal can be changed to the operation of a component covering a spare wavelength by switching the operation in the corresponding optical network unit to an operation using a spare wavelength. Thus, the optical network system according to the second embodiment permits a rapid and efficient recovery of an optical network system.

Furthermore, each optical network unit can cover the spare wavelength that is common to a plurality of optical network units in an optical network system, so when a failure has occurred, it is possible to switch to an operation using a spare wavelength without any replacement by a maintainer. Thus, the optical network system according to the second embodiment permits a reduction in a maintenance cost of an optical network system.

An example of processing of switching of operation between a working wavelength and a spare wavelength in the optical network system 3 according to the second embodiment will now be described with reference to FIGS. 7 to 9. As an example, a case in which the optical network system 3 is included in the communication system 1 illustrated in FIG. 1 will be described below.

Figure 7:
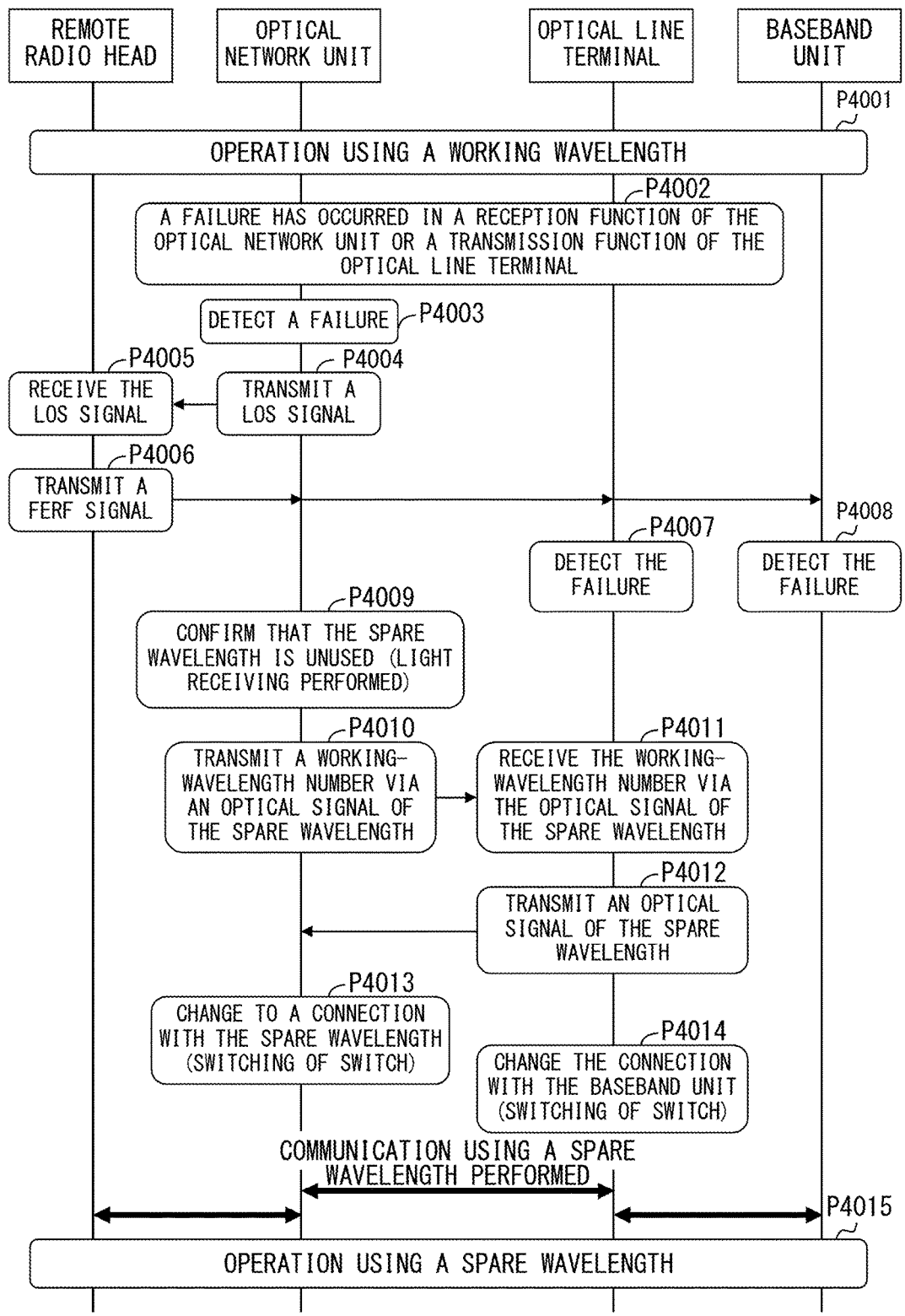
FIG. 7 is a sequence diagram which illustrates exemplary processing of switching of operation from a working wavelength to a spare wavelength in the optical network system according to the second embodiment in a third case.

FIG. 7 is a sequence diagram which illustrates exemplary processing of switching of operation from a working wavelength to a spare wavelength in the optical network system according to the second embodiment in a third case. The third case illustrated in FIG. 7 is a case in which a failure has occurred in a reception function of the optical network unit 40B or a transmission function of the optical line terminal 20. The failure in the reception function of the optical network unit 40B or the transmission function of the optical line terminal 20 will hereinafter be referred to as a failure 3 for convenience.

In Process P4001, a working wavelength (a transmission wavelength and a reception wavelength) uniquely assigned to the optical network unit 40B is used for an optical signal transmitted and received between the optical line terminal 20 and the optical network unit 40B, and a communication is performed between the baseband unit 10 and the remote radio head 50.

When a failure 3 has occurred during an operation in Process P4001 (Process P4002), the CPU 41 of the optical network unit 40B determines that a signal level of the optical signal of the working wavelength transmitted from the optical line terminal 20, that is, a signal level of the optical signal of the reception wavelength, is not greater than a predetermined threshold, and detects the failure 3 (Process P4003). The CPU 41 generates a loss-of-signal signal and transmits the generated loss-of-signal signal to the remote radio head 50 via the communication interface 45 (Process P4004).

The remote radio head 50 receives the loss-of-signal signal transmitted from the optical network unit 40B (Process P4005). The remote radio head 50 generates a far-end receive failure signal on the basis of the received loss-of-signal signal and transmits the generated far-end receive failure signal to the baseband unit 10 (Process P4006).

The CPU 21 of the optical line terminal 20 receives the far-end receive failure signal transmitted from the remote radio head 50 via the dual directional coupler 22, the optical coupler 23, and the photoelectric conversion module 24. The CPU 21 detects the failure 3 by the received far-end receive failure signal (Process P4007). The CPU 21 generates a failure detection alarm signal and transmits the generated failure detection alarm signal to the computer 90 for monitoring and controlling. Further, the CPU 21 transfers the received far-end receive failure signal to the baseband unit 10 via the communication interface 26.

The baseband unit 10 receives the far-end receive failure signal transferred from the optical line terminal 20 and detects the failure 3 on the basis of the received far-end receive failure signal (Process P4008). The baseband unit 10 generates a failure detection alarm signal and transmits the generated failure detection alarm signal to maintenance equipment (not shown) via an upper network.

A maintainer can determine the optical network unit 40B corresponding to the failure 3 by the failure detection alarm signal transmitted to the computer 90 for monitoring and controlling and to the maintenance equipment.

The CPU 41 of the optical network unit 40B confirms whether the spare wavelength is in an unused state by measuring a light-receiving level of the spare reception wavelength via the dual directional coupler 42 and the optical demultiplexer 43 (Process P4009). As described above, the spare wavelength may be used in common for a plurality of optical network units 40B in operation. Thus, there may already be an optical line in which the spare wavelength is used for an optical communication between another optical network unit 40B and the optical line terminal 20. The plurality of optical network units 40B may be installed away from one another, so it is not easy and it takes time to confirm whether the spare wavelength is already being used by another optical network unit 40B. So, performing Process 4009 permits preventing of communication failure that is caused when a spare wavelength is redundantly used by a plurality of optical lines. When the light-receiving level of the spare reception wavelength is not greater than a predetermined threshold in Process P4009, it is confirmed that an optical output of the spare reception wavelength is stopped, that is, that the spare wavelength is in an unused state.

When it has been confirmed that a spare wavelength is in an unused state in Process P4009, the CPU 41 transmits to the optical line terminal 20 a wavelength number (data) that indicates the unique working wavelength assigned to its optical network unit 40B by use of an optical signal of the spare transmission wavelength (Process P4010). The CPU 21 of the optical line terminal 20 receives the wavelength number of the working wavelength transmitted from the optical network unit 40B via the dual directional coupler 22, the optical coupler 23, and the photoelectric conversion module 24 covering a spare wavelength (Process P4011).

The CPU 21 transmits an optical signal of the spare wavelength to the optical network unit 40B via the photoelectric conversion module 24 covering a spare wavelength, the optical coupler 23, and the dual directional coupler 22 (Process P4012). The spare wavelength of the optical signal transmitted from the optical line terminal 20 corresponds to the spare reception wavelength of the optical network unit 40B.

The CPU 41 of the optical network unit 40B operates the switch 48 so as to switch a photoelectric conversion module connected to the communication interface 45 from the photoelectric conversion module 44 covering a working wavelength to the photoelectric conversion module 46 for a spare wavelength (Process P4013).

The CPU 21 of the optical line terminal 20 operates the switch 25 so as to switch a photoelectric conversion module 24 connected to the communication interface 26 from the photoelectric conversion module 24 covering the working wavelength indicated by the received wavelength number to the photoelectric conversion module 24 covering a spare wavelength (Process P4014). In this way, the optical line terminal 20 can determine a working wavelength to be switched to a spare wavelength by referring to the received wavelength number, with the result that it can switch from the working wavelength to the spare wavelength automatically and without error.

When the processing up to Process P4014 is completed, an optical line in which the spare wavelength is used between the optical network unit 40B and the optical line terminal 20 is established. Further, a line between the optical line terminal 20 that has been switched to cover a spare wavelength and the baseband unit 10, and a line between the optical network unit 40B and the remote radio head 50 are established. Then, the spare wavelength (the spare transmission wavelength and the spare reception wavelength) is used for an optical signal transmitted and received between the optical line terminal 20 and the optical network unit 40B, and a communication is performed between the baseband unit 10 and the remote radio head 50 (Process P4015).

Figure 8:
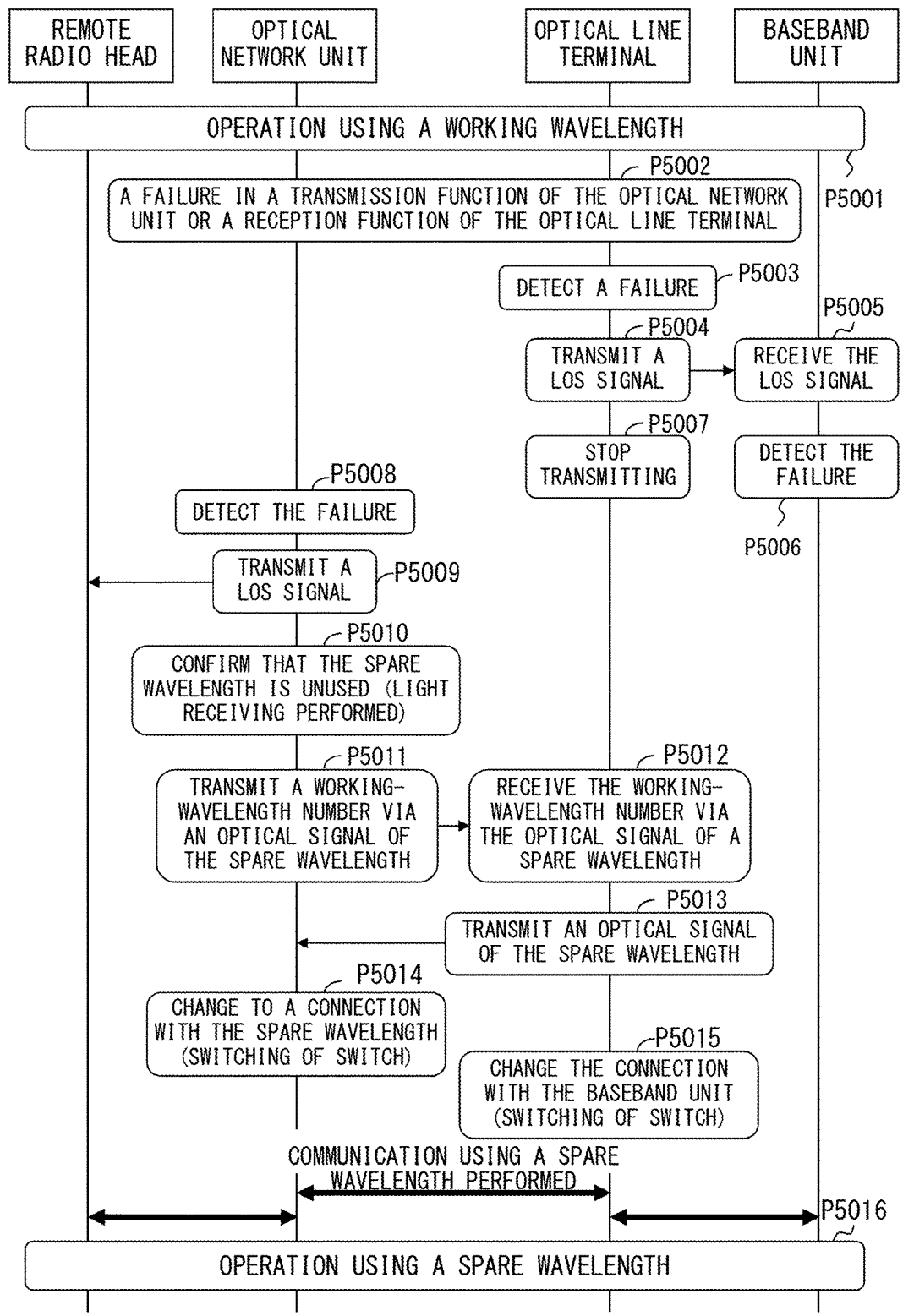
FIG. 8 is a sequence diagram which illustrates exemplary processing of switching of operation from a working wavelength to a spare wavelength in the optical network system according to the second embodiment in a fourth case.

FIG. 8 is a sequence diagram which illustrates exemplary processing of switching of operation from a working wavelength to a spare wavelength in the optical network system according to the second embodiment in a fourth case. The fourth case illustrated in FIG. 8 is a case in which a failure has occurred in a transmission function of the optical network unit 40B or a reception function of the optical line terminal 20. The failure in the transmission function of the optical network unit 40B or the reception function of the optical line terminal 20 will hereinafter be referred to as a failure 4 for convenience.

In Process P5001, a working wavelength (a transmission wavelength and a reception wavelength) uniquely assigned to the optical network unit 40B is used for an optical signal transmitted and received between the optical line terminal 20 and the optical network unit 40B, and a communication is performed between the baseband unit 10 and the remote radio head 50.

When a failure 4 has occurred during an operation in Process P5001 (Process P5002), the CPU 21 of the optical line terminal 20 determines that a signal level of the optical signal of the working wavelength transmitted from the optical network unit 40B, that is, a signal level of the optical signal of the transmission wavelength, is not greater than a predetermined threshold, and detects the failure 4 (Process 5003). The CPU 21 generates a failure detection alarm signal and transmits the generated failure detection alarm signal to the computer 90 for monitoring and controlling. Further, the CPU 21 generates a loss-of-signal signal and transmits the generated loss-of-signal signal to the baseband unit 10 via the communication interface 26 (Process P5004).

The baseband unit 10 receives the loss-of-signal signal transmitted from the optical line terminal 20 (Process P5005). The baseband unit 10 detects the failure 4 on the basis of the received loss-of-signal signal (Process P5006). The baseband unit 10 generates a failure detection alarm signal and transmits the generated failure detection alarm signal to maintenance equipment (not shown) via an upper network.

The CPU 21 of the optical line terminal 20 operates an photoelectric conversion module 24 that covers the working wavelength in which the failure 4 has been detected, and stops an optical output of the working wavelength of the optical signal that is received by the optical network unit 40B, that is, an optical output of a reception wavelength (Process P5007). When the optical output of a reception wavelength is stopped, the CPU 41 of the optical network unit 40B determines that a signal level of the optical signal of the working wavelength transmitted from the optical line terminal 20, that is, a signal level of the optical signal of the reception wavelength, is not greater than a predetermined threshold, and detects the failure 4 (Process P5008). The CPU 41 generates a loss-of-signal signal and transmits the generated loss-of-signal signal to the remote radio head 50 via the communication interface 45 (Process P5009).

A maintainer can determine the optical network unit 40B corresponding to the failure 4 by the failure detection alarm signal transmitted to the computer 90 for monitoring and controlling and to the maintenance equipment.

The CPU 41 of the optical network unit 40B confirms whether the spare wavelength is in an unused state by measuring a light-receiving level of the spare reception wavelength via the dual directional coupler 42 and the optical demultiplexer 43 (Process P5010). When it has been confirmed that the optical output of the spare reception wavelength is stopped and that the spare wavelength is in an unused state, the CPU 41 transmits to the optical line terminal 20 a wavelength number that indicates the unique working wavelength assigned to its optical network unit 40B by use of an optical signal of the spare transmission wavelength (Process P5011).

The CPU 21 of the optical line terminal 20 receives the wavelength number of the working wavelength transmitted from the optical network unit 40B via the dual directional coupler 22, the optical coupler 23, and the photoelectric conversion module 24 covering a spare wavelength (Process P5012). The CPU 21 transmits an optical signal of the spare wavelength to the optical network unit 40B via the photoelectric conversion module 24 covering a spare wavelength, the optical coupler 23, and the dual directional coupler (Process P5013). The spare wavelength of the optical signal transmitted from the optical line terminal 20 corresponds to the spare reception wavelength of the optical network unit 40B.

The CPU 41 of the optical network unit 40B operates the switch 48 so as to switch a photoelectric conversion module connected to the communication interface 45 from the photoelectric conversion module 44 covering a working wavelength to the photoelectric conversion module 46 for a spare wavelength (Process P5014). Further, the CPU 21 of the optical line terminal 20 operates the switch 25 so as to switch a photoelectric conversion module 24 connected to the communication interface 26 from the photoelectric conversion module 24 covering the working wavelength indicated by the received wavelength number to the photoelectric conversion module 24 covering a spare wavelength (Process P5015).

When the processing up to Process P5015 is completed, an optical line in which the spare wavelength is used between the optical network unit 40B and the optical line terminal 20 is established. Further, a line between the optical line terminal 20 that has been switched to cover a spare wavelength and the baseband unit 10, and a line between the optical network unit 40B and the remote radio head 50 are established. Then, the spare wavelength (the spare transmission wavelength and the spare reception wavelength) is used for an optical signal transmitted and received between the optical line terminal 20 and the optical network unit 40B, and a communication is performed between the baseband unit 10 and the remote radio head 50 (Process P5016).

FIG. 9 is a sequence diagram which illustrates exemplary processing of switching of operation from a spare wavelength to a working wavelength in the optical network system according to the second embodiment. The exemplary switching processing sequence illustrated in FIG. 9 may be performed, for example, when a component is repaired that covers a working wavelength in the optical network unit 40B whose operation has been switched to an operation using a spare wavelength due to the failure 3 or 4.

In Process P6001, a spare wavelength (a spare transmission wavelength and a spare reception wavelength) is used for an optical signal transmitted and received between the optical line terminal 20 and the optical network unit 40B, and a communication is performed between the baseband unit 10 and the remote radio head 50.

During an operation in Process P6001, a maintainer stops a light-receiving function of the optical network unit 40B such as the optical demultiplexer 43 in order to switch to the operation using a working wavelength (Process P6002). The CPU 41 of the optical network unit 40B determines that a signal level of the optical signal of the spare wavelength transmitted from the optical line terminal 20, that is, a signal level of the optical signal of the reception wavelength, is not greater than a predetermined threshold, and detects the failure 3 (Process P6003). The failure 3 detected in Process P6003 was intentionally caused by the maintainer in order to switch to the operation using a working wavelength, and indicates that the processing of switching of operation from a spare wavelength to a working wavelength is being performed, that is, that it is in a switching-processing state. The CPU 41 generates a loss-of-signal signal and transmits the generated loss-of-signal signal to the remote radio head 50 via the communication interface 45 (Process P6004).

The remote radio head 50 receives the loss-of-signal signal transmitted from the optical network unit 40B (Process P6005). The remote radio head 50 generates a far-end receive failure signal on the basis of the received loss-of-signal signal, and transmits the generated far-end receive failure signal to the baseband unit 10 (Process P6006).

The CPU 21 of the optical line terminal 20 receives the far-end receive failure signal transmitted from the remote radio head 50 via the dual directional coupler 22, the optical coupler 23, and the photoelectric conversion module 24 covering a spare wavelength. The CPU 21 detects the failure 3, that is, a switching-processing state, on the basis of the received far-end receive failure signal (Process P6007). The CPU 21 generates a failure detection alarm signal and transmits the generated failure detection alarm signal to the computer 90 for monitoring and controlling. Further, the CPU 21 transfers the received far-end receive failure signal to the baseband unit 10 via the communication interface 26.

The baseband unit 10 receives the far-end receive failure signal transferred from the optical line terminal 20 and detects the failure 3, that is, a switching-processing state, on the basis of the received far-end receive failure signal (Process P6008). The baseband unit 10 generates a failure detection alarm signal and transmits the generated failure detection alarm signal to maintenance equipment (not shown) via an upper network.

The maintainer can recognize from the failure detection alarm signal that has been transmitted to the computer 90 for monitoring and controlling and to the maintenance equipment that the processing of switching of operation from a spare wavelength to a working wavelength is being performed normally.

The CPU 41 of the optical network unit 40B confirms whether the working wavelength is in an unused state by measuring a light-receiving level of the working reception wavelength via the dual directional coupler 42 and the optical demultiplexer 43 (Process P6009). When it has been confirmed that the working wavelength is in an unused state, the CPU 41 transmits an optical signal of the working wavelength to the optical line terminal 20 (Process P6010).

The CPU 21 of the optical line terminal 20 receives the optical signal of the working wavelength transmitted from the optical network unit 40B via the dual directional coupler 22, the optical coupler 23, and the photoelectric conversion module 24 covering a working wavelength (Process P6011). The wavelength number of the working wavelength to be switched from the spare wavelength is indicated in the received optical signal.

The CPU 21 transmits to the optical network unit 40B the optical signal of the working wavelength via the photoelectric conversion module 24 covering the working wavelength indicated by the received wavelength number, the optical coupler 23, and the dual directional coupler 22 (Process P6012). The working wavelength of the optical signal transmitted from the optical line terminal 20 corresponds to the reception wavelength uniquely assigned to the optical network unit 40B.

The CPU 41 of the optical network unit 40B operates the switch 48 so as to switch a photoelectric conversion module connected to the communication interface 45 from the photoelectric conversion module 46 for a spare wavelength to the photoelectric conversion module 44 covering a working wavelength (Process P6013).

The CPU 21 of the optical line terminal 20 operates the switch 25 so as to switch a photoelectric conversion module 24 connected to the communication interface 26 from the photoelectric conversion module 24 covering a spare wavelength to the photoelectric conversion module 24 covering the working wavelength indicated by the received wavelength number (Process P6014). Then, the CPU 21 operates the photoelectric conversion module 24 covering a spare wavelength, and stops an optical output of the spare wavelength (Process P6015) so that a spare wavelength is in an unused state. In this way, the optical line terminal 20 can determine a working wavelength to be switched by referring to the received wavelength number, with the result that it can switch from a spare wavelength to the working wavelength automatically and without error.

When the processing up to Process P6015 is completed, an optical line in which the working wavelength is used between the optical network unit 40B and the optical line terminal 20 is established. Further, a line between the optical line terminal 20 that has been switched to cover a working wavelength and the baseband unit 10, and a line between the optical network unit 40B and the remote radio head 50 are established. Then, the working wavelength (the unique transmission wavelength and the unique reception wavelength) is used for an optical signal transmitted and received between the optical line terminal 20 and the optical network unit 40B, and a communication is performed between the baseband unit 10 and the remote radio head 50 (Process P6016).

As described above, the optical communication method using the optical network system according to the second embodiment permits a considerable reduction in a manufacturing cost of a spare component and in maintenance and operation costs of a network because a component is standardized that covers a spare wavelength for a plurality of optical network units that have been assigned different combinations of wavelengths than one another.

Further, the optical communication method using the optical network system according to the second embodiment permits a rapid and efficient switching to a spare wavelength and an easy and assured recovery of an optical line in which a failure has occurred because of a standardization of a spare wavelength that may be used for a plurality of optical network units. Furthermore, an error in maintenance such as a mistaken switching to a different combination of wavelengths can be prevented, and therefore a failure such as a disconnection of the presently used line due to the error in maintenance can be prevented, with the result that it is possible to improve the reliability of an entire optical network system.

Moreover, when a failure has occurred in a component covering a certain combination of wavelengths in an optical line terminal, the operation in the optical line terminal can be changed to the operation using a component covering a spare wavelength by switching the operation in the corresponding optical network unit to an operation using a spare wavelength. Thus, the optical communication method using the optical network system according to the second embodiment permits a rapid and efficient recovery of an optical network system.

Furthermore, each optical network unit can cover a spare wavelength that is common to a plurality of optical network units in an optical network system, so when a failure has occurred, it is possible to switch to an operation using a spare wavelength without any replacement by a maintainer. Thus, the optical communication method using the optical network system according to the second embodiment permits a reduction in a maintenance cost of an optical network system.

<Third Embodiment>

Also, the optical network system according to the first embodiment and the optical network system according to the second embodiment described above can be combined.

For example, the optical network system 1 illustrated in FIG. 3 may be configured so that the optical network unit 40B replaces a portion of the plurality of optical network units 40A and is connected to the optical line terminal 20 via the optical splitter 30.

The optical network system and the optical communication method according the third embodiment described above provides a similar advantage to that provided by the optical network system and the optical communication method according to the first or second embodiment.

An optical network system according to an aspect of the present invention permits a reduction in maintenance and operation costs and an easy and assured recovery of an optical line in which a failure has occurred.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical network system comprising:
an optical line terminal;
an optical splitter that is connected to the optical line terminal via one first optical fiber; and
a plurality of optical network units that are connected to the optical splitter via respective second optical fibers, wherein
the plurality of optical network units respectively communicate with the optical line terminal using corresponding working wavelengths uniquely assigned to the plurality of optical network units,
the optical line terminal communicates with an optical network unit in the plurality of optical network units using a corresponding working wavelength that is assigned to the optical network unit and communicates with a spare optical network unit in the plurality of optical network units using a spare wavelength through which all of the plurality of optical network units are able to receive an optical signal when a failure has occurred in communication using the working wavelength, and
the optical network unit that is connected to the optical splitter transmits to the optical line terminal a wavelength number that indicates the working wavelength to be replaced with the spare wavelength before an operation of a communication between the optical network unit and the optical line terminal is switched from an operation using the working wavelength to an operation using the spare wavelength.

2. The optical network system according to claim 1, wherein
the optical network unit that is connected to the optical splitter confirms that the spare wavelength is in an unused state by measuring a light-receiving level of the spare wavelength before an operation of a communication between the optical network unit and the optical line terminal is switched from an operation using the working wavelength to an operation using the spare wavelength.

3. The optical network system according to claim 1, wherein
the optical network unit that is connected to the optical splitter confirms that the working wavelength is in an unused state by measuring a light-receiving level of the working wavelength before an operation of a communication between the optical network unit and the optical line terminal is switched from an operation using the spare wavelength to an operation using the working wavelength.

4. The optical network system according to claim 1, wherein
the optical line terminal stops an optical output of the spare wavelength during which a communication by use of an optical signal of the spare wavelength is not performed between the optical network unit that is connected to the optical splitter and the optical line terminal.

5. The optical network system according to claim 1, wherein
the spare wavelength is assigned to a spare optical network unit that is different from the plurality of optical network units, and
the optical line terminal communicates with the spare optical network unit by use of an optical signal of the spare wavelength when, instead of one of the plurality of optical network units, the spare optical network unit is connected to the optical splitter.

6. The optical network system according to claim 1, wherein
the spare wavelength is assigned to the plurality of optical network units, and
the optical line terminal communicates with one of the plurality of optical network units by use of an optical signal of the spare wavelength instead of an optical signal of the working wavelength.

7. An optical communication method executable by an optical network system that includes an optical line terminal, an optical splitter that is connected to the optical line terminal via one first optical fiber, and a plurality of optical network units that are connected to the optical splitter via respective second optical fibers, the optical communication method comprising:
respectively communicating, by the plurality of optical network units, with the optical line terminal using corresponding working wavelengths uniquely assigned to the plurality of optical network units;
communicating, by the optical line terminal, with an optical network unit in the plurality of optical network units using a corresponding working wavelength that is assigned to the optical network unit and with a spare optical network unit in the plurality of optical network units using a spare wavelength through which all of the plurality of optical network units are able to receive an optical signal when a failure has occurred in communication using the working wavelength; and
transmitting, by the optical network unit that is connected to the optical splitter, to the optical line terminal a wavelength number that indicates the working wavelength to be replaced with the spare wavelength before an operation of a communication between the optical network unit and the optical line terminal is switched from an operation using the working wavelength to an operation using the spare wavelength.

8. The optical communication method according to claim 7, wherein
the optical network unit that is connected to the optical splitter confirms that the spare wavelength is in an unused state by measuring a light-receiving level of the spare wavelength before an operation of a communication between the optical network unit and the optical line terminal is switched from an operation using the working wavelength to an operation using the spare wavelength.

9. The optical communication method according to claim 7, wherein
the optical network unit that is connected to the optical splitter confirms that the working wavelength is in an unused state by measuring a light-receiving level of the working wavelength before an operation of a communication between the optical network unit and the optical line terminal is switched from an operation using the spare wavelength to an operation using the working wavelength.

10. The optical network system according to claim 7, wherein
the optical line terminal stops an optical output of the spare wavelength during which a communication by use of an optical signal of the spare wavelength is not performed between the optical network unit that is connected to the optical splitter and the optical line terminal.

11. The optical communication method according to claim 7, wherein
the spare wavelength is assigned to a spare optical network unit that is different from the plurality of optical network units, and
the optical line terminal communicates with the spare optical network unit by use of an optical signal of the spare wavelength when, instead of one of the plurality of optical network units, the spare optical network unit is connected to the optical splitter.

12. The optical communication method according to claim 7, wherein
the spare wavelength is assigned to the plurality of optical network units, and
the optical line terminal communicates with one of the plurality of optical network units by use of an optical signal of the spare wavelength instead of an optical signal of the working wavelength.

* * * * *